(12) United States Patent
Nishio

(10) Patent No.: US 7,958,275 B2
(45) Date of Patent: Jun. 7, 2011

(54) INFORMATION PROCESSING APPARATUS, NETWORK DEVICE, CONTROL METHOD THEREFOR, COMPUTER PROGRAM, AND COMPUTER READABLE STORAGE MEDIUM

(75) Inventor: Masahiro Nishio, Higashiyamato (JP)

(73) Assignee: Canon Kabushiki Kaisha (JP)

( * ) Notice: Subject to any disclaimer, the term of this patent is extended or adjusted under 35 U.S.C. 154(b) by 1313 days.

(21) Appl. No.: 11/467,304

(22) Filed: Aug. 25, 2006

(65) Prior Publication Data

US 2007/0067413 A1    Mar. 22, 2007

(30) Foreign Application Priority Data

Aug. 31, 2005   (JP) ................. 2005-252473

(51) Int. Cl.
*G06F 3/00* (2006.01)
(52) U.S. Cl. .......... 710/8
(58) Field of Classification Search ........ 710/8
See application file for complete search history.

(56) References Cited

U.S. PATENT DOCUMENTS

| | | | |
|---|---|---|---|
| 7,768,664 B2 | 8/2010 | Asano | |
| 2003/0051069 A1* | 3/2003 | Iida | 709/321 |
| 2005/0114481 A1* | 5/2005 | Higuchi et al. | 709/220 |
| 2006/0047859 A1* | 3/2006 | Cavalaris et al. | 710/8 |

FOREIGN PATENT DOCUMENTS

| | | |
|---|---|---|
| JP | 2002-169673 A | 6/2002 |
| JP | 2003-99219 | 4/2003 |
| JP | 2004-38956 | 2/2004 |
| JP | 2004-362594 | 12/2004 |
| JP | 2005-086559 A | 3/2005 |

OTHER PUBLICATIONS

Office Action issued in corresponding Japanese Patent Application No. 2005-252473 dated Dec. 17, 2010.

* cited by examiner

*Primary Examiner* — Chun-Kuan Lee
*Assistant Examiner* — Brooke J Dews
(74) *Attorney, Agent, or Firm* — Rossi, Kimms & McDowell LLP

(57) ABSTRACT

This invention makes it possible to automatically install the device driver of only an intended network device on a network. Pieces of identification information for temporarily recognizing partners are input in both a client terminal and a network compliant device corresponding to a driver to be installed. When the identification information is input, the network compliant device multicasts a Hello message which describes the identification information and is necessary to enter the network. The client terminal receives the Hello message, and when information which matches the input identification information is described in the Hello message, shifts to a process based on UPnP. When the client terminal receives a Hello message not containing any description which matches the identification information, it does not notify the OS of the message.

12 Claims, 27 Drawing Sheets

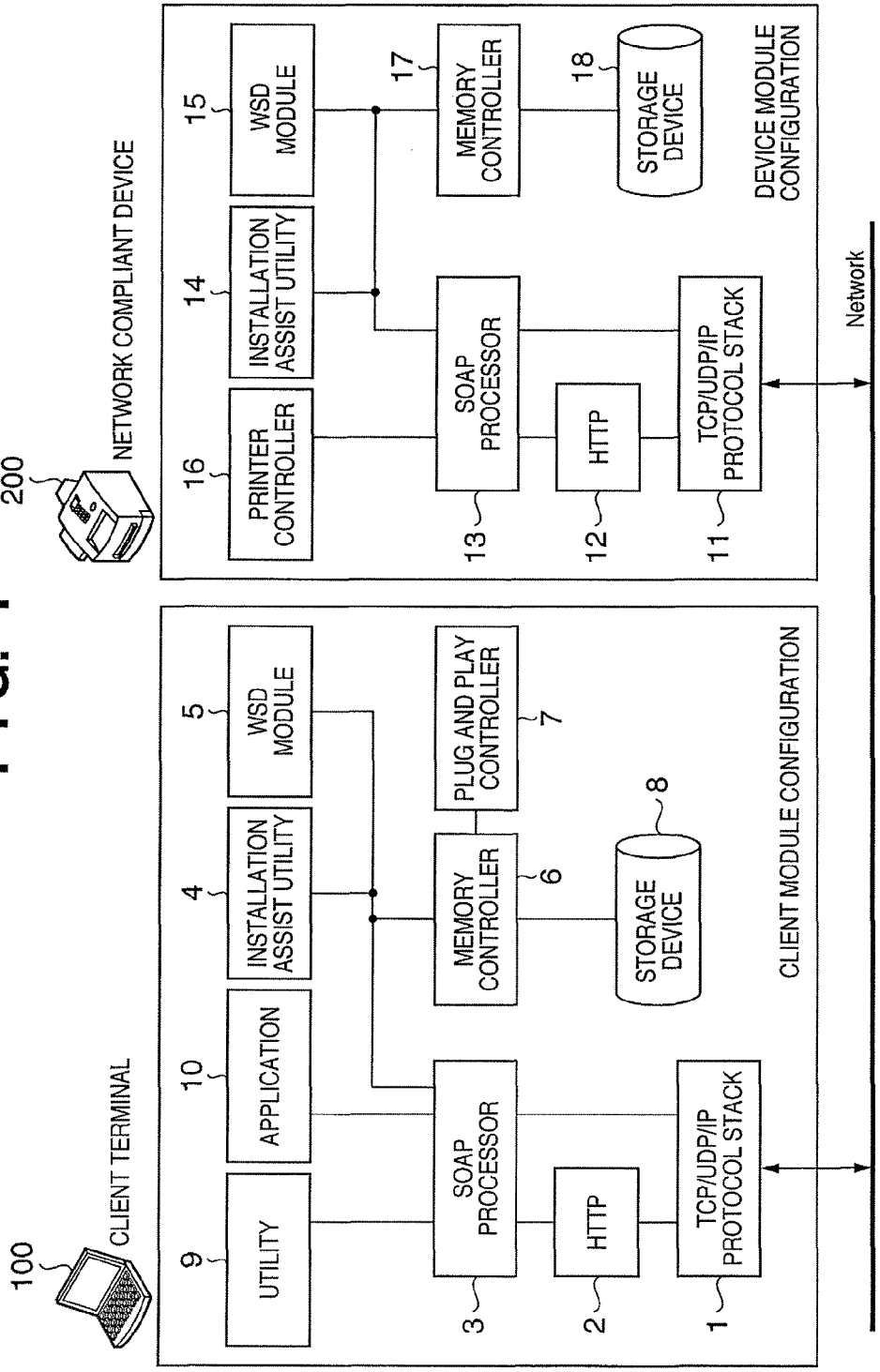

F I G. 3
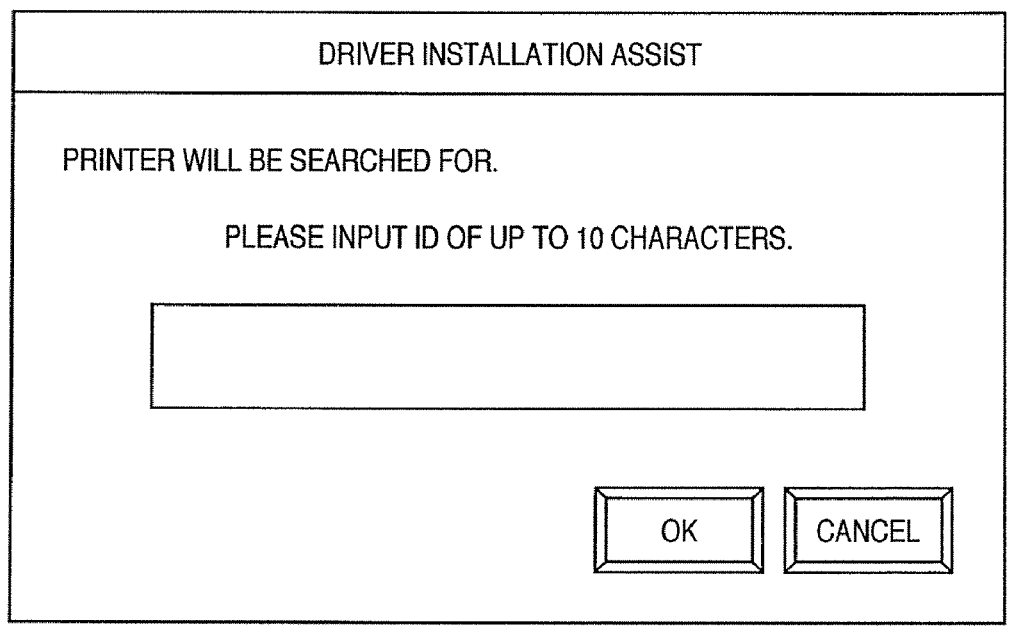

FIG. 5

```
<s:Envelope ... >
  <s:Header ... >
    <a:Action ... >
        http://schemas. xmlsoap.org/ws/2005/04/discovery/Hello
    </a:Action>
    <a:MessageID ... >xs:anyURI</a:MessageID>
    [<a:RelatesTo RelationshipType="d:Suppression">
        xs:anyURI
    </a:RelatesTo>]?
    <a:To ... >urn:schemas-xmlsoap-org:ws:2005:04:discovery</a:To>
    <d:AppSequence ... />
    ...
  </s:Header>
  <s:Body ... >
    <d:Hello ... >
        <a:EndpointReference> ... </a:EndpointReference>

<Type>123456myid</Types>

...
    </d:Hello>
  </s:Body>
</s:Envelope>
```

FIG. 6

```
<s12:Envelope
    xmlns:s12='http://www.w3.org/2003/05/soap-envelope'
    xmlns:wsa='http://schemas. xmlsoap.org/ws/2004/08/addressing'
    xmlns:wsp='http://schemas. xmlsoap.org/ws/2004/09/mex'>
  <s12:Header>
    <wsa:Action>
       http://schemas. xmlsoap.org/ws/2004/09/mex/GetMetadata/Request
    </wsa:Action>
    <wsa:MessageID>
        uuid:73d7edfc-5c3c-49b9-ba46-2480caee43e9
    </wsa:MessageID>
    <wsa:ReplyTo>
       <wsa:Address>http://client.example.com/MyEndpoint</wsa:Address>
    </wsa:ReplyTo>
    <wsa:To>http://server.example.org/YourEndpoint</wsa:To>
    <ex:MyRefProp xmlns:ex='http://server.example.org/refs'>
        78f2dc229597b529b81c4bef76453c96
    </ex:MyRefProp>
  </s12:Header>
  <s12:Body>
    <wsx:GetMetadata>
      <wsx:Dialect>
           http://aaa.bbb.com/printer/DeviceData
      </wsx:Dialect>
    </wsx:GetMetadata>
  </s12:Body>
</s12:Envelope>
```

FIG. 7

```
<s12:Envelope
    xmlns:s12='http://www.w3.org/2003/05/soap-envelope'
    xmlns:wsa='http://schemas. xmlsoap.org/ws/2004/08/addressing'
    xmlns:wsp='http://schemas. xmlsoap.org/ws/2004/09/policy'
    xmlns:wsx='http://schemas. xmlsoap.org/ws/2004/09/mex'>
  <s12:Header>
    <wsa:Action>
      http://schemas. xmlsoap.org/ws/2004/09/mex/GetMetadata/Response
    </wsa:Action>
    <wsa:RelatesTo>
         uuid:73d7edfc-5c3c-49b9-ba46-2480caee43e9
    </wsa:RelatesTo>
    <wsa:To>http://client.example.com/MyEndpoint</wsa:To>
  </s12:Header>
  <s12:Body>
    <wsx:Metadata>
      <wsx:MetadataSection Dialect='http://aaa.bbb.com/printer/DeviceData>
       <DeviceData>
            <Manufacturer>xxx company</Manufacturer>
            <ModelName>NetworkPrinter123</ModelName>
       </DeviceID>

</wsx:MetadataSection>
    </wsx:Metadata>
  </s12:Body>
</s12:Envelope>
```

F I G. 10
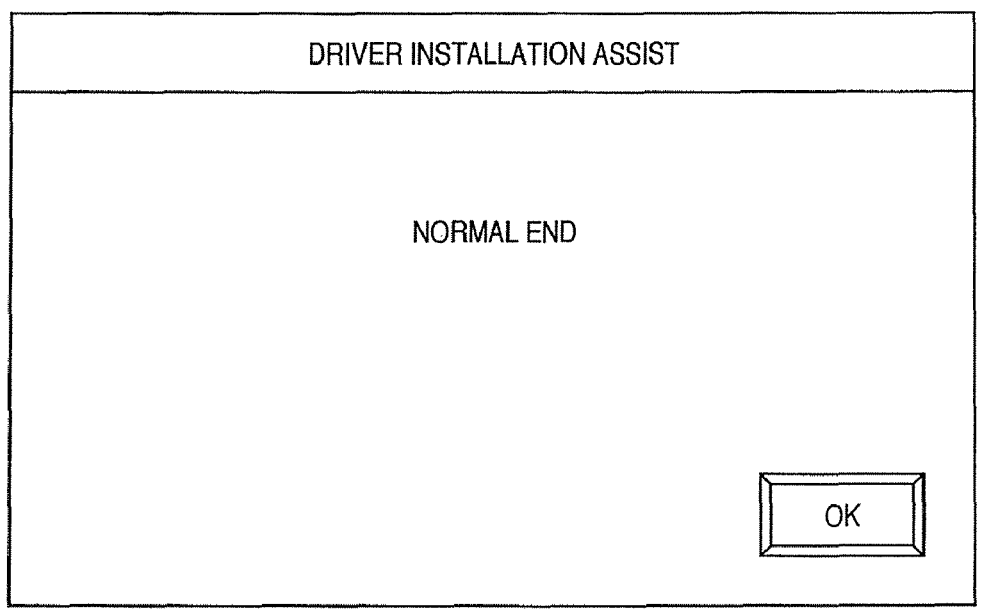

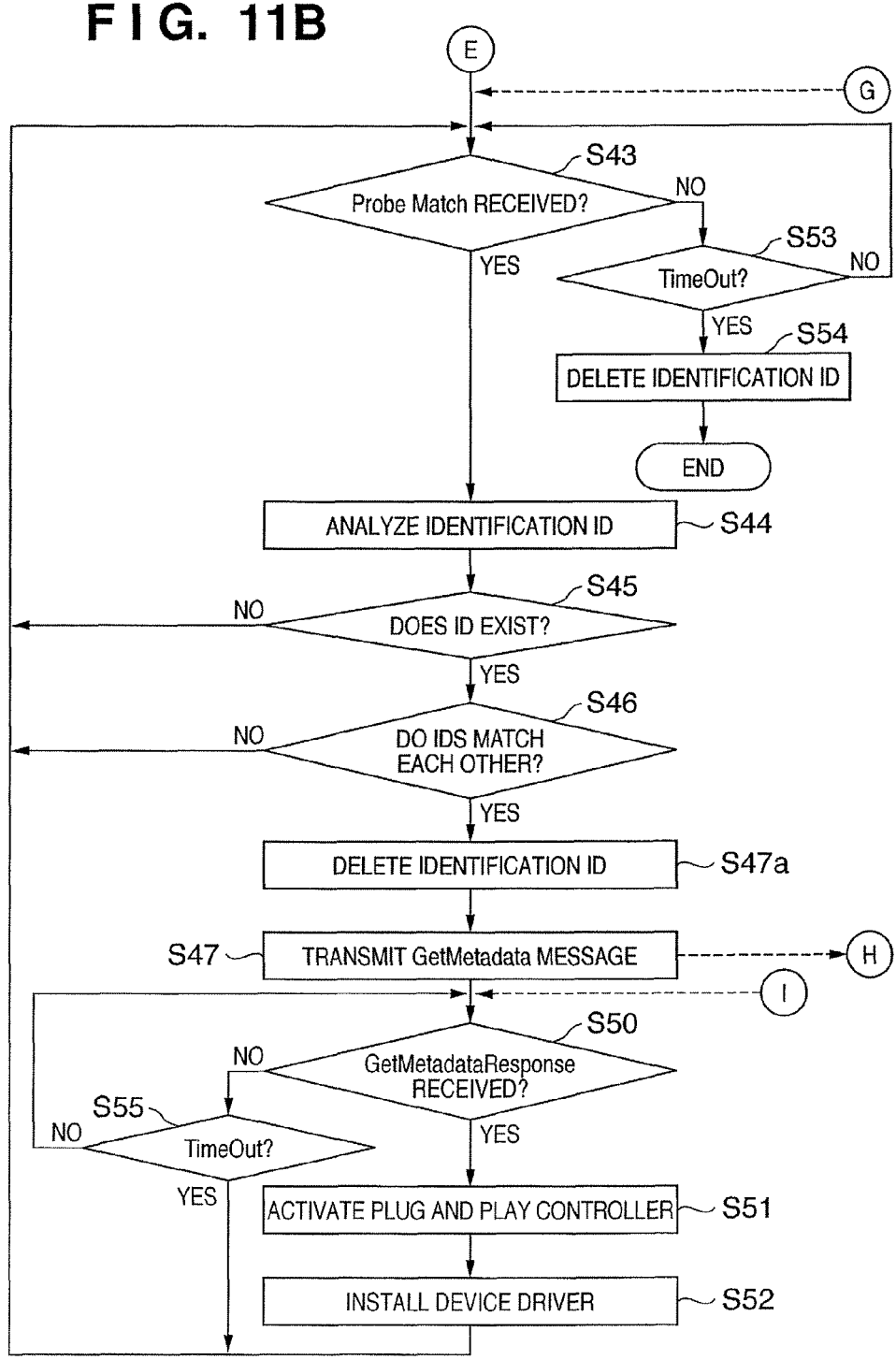

FIG. 14

```
<s:Envelope
    xmlns:a ="http://schemas. xmlsoap.org/ws/2004/08/addressing"
    xmlns:d ="http://schemas. xmlsoap.org/ws/2005/04/discovery"
    xmlns:i ="http://printer. example.org/2003/imaging"
    xmlns:s ="http://www.w3.org/2003/05/soap-envelope">
  <s:Header>
    <a:Action>
       http://schemas. xmlsoap.org/ws/2005/04/discovery/Probe
    </a:Action>
    <a:MessageID>
       uuid:0a6dc791-2be6-4991-9af1-454778a1917a
    </a:MessageID>
    <a:To>urn:schemas-xmlsoap-org:ws:2005:04:discovery</a:To>
  </s:Header>
  <s:Body>
    <d:Probe>
      <d:Types>i:PrintBasic</d:Types>
      <d:Scopes MatchBy="http://schemas. xmlsoap.org/ws/2005/04/discovery/ldap">
         ldap:///ou=engineering,o=examplecom,c=us
      </d:Scopes>
    </d:Probe>
  </s:Body>
</s:Envelope>
```

FIG. 15

```
<s:Body>
   <d:ProbeMatches>
      <d:ProbeMatch>
         <a:EndpointReference>
            <a:Address>
               uuid:98190dc2-0890-4ef8-ac9a-5940995e6119
            </a:Address>
         </a:EndpointReference>
            <d:Type>123456myid</d:Types>
         <d:Scopes>
            ldap:///ou=engineering,o=examplecom,c=us
            ldap:///ou=floor1,ou=b42,ou=anytown,o=examplecom,c=us
            http://itdept/imaging/deployment/2004-12-04
         </d:Scopes>
         <d:XAddrs>http://prn-example/PRN42/b42-1668-a</d:XAddrs>
         <d:MetadataVersion>75965</d:MetadataVersion>
      </d:ProbeMatch>
   </d:ProbeMatches>
</s:Body>
</s:Envelope>
```

FIG. 16

```
<s12:Envelope
    xmlns:s12='http://www.w3.org/2003/05/soap-envelope'
    xmlns:wsa='http://schemas. xmlsoap.org/ws/2004/08/addressing'
    xmlns:wsp='http://schemas. xmlsoap.org/ws/2004/09/mex'>
  <s12:Header>
    <wsa:Action>
      http://schemas. xmlsoap.org/ws/2004/09/mex/GetMetadata/Request
    </wsa:Action>
    <wsa:MessageID>
        uuid:73d7edfc-5c3c-49b9-ba46-2480caee43e9
    </wsa:MessageID>
    <wsa:ReplyTo>
      <wsa:Address>http://client.example.com/MyEndpoint</wsa:Address>
    </wsa:ReplyTo>
    <wsa:To>http://server.example.org/YourEndpoint</wsa:To>
    <ex:MyRefProp xmlns:ex='http://server.example.org/refs'>
        78f2dc229597b529b81c4bef76453c96
    </ex:MyRefProp>
  </s12:Header>
  <s12:Body>
    <wsx:GetMetadata>
      <wsx:Dialect>
            http://aaa.bbb.com/printer/DeviceData
      </wsx:Dialect>
    </wsx:GetMetadata>
  </s12:Body>
</s12:Envelope>
```

FIG. 17

```
<s12:Envelope
    xmlns:s12='http://www.w3.org/2003/05/soap-envelope'
    xmlns:wsa='http://schemas. xmlsoap.org/ws/2004/08/addressing'
    xmlns:wsp='http://schemas. xmlsoap.org/ws/2004/09/policy'
    xmlns:wsx='http://schemas. xmlsoap.org/ws/2004/09/mex'>
  <s12:Header>
    <wsa:Action>
      http://schemas. xmlsoap.org/ws/2004/09/mex/GetMetadata/Response
    </wsa:Action>
    <wsa:RelatesTo>
        uuid:73d7edfc-5c3c-49b9-ba46-2480caee43e9
    </wsa:RelatesTo>
    <wsa:To>http://client.example.com/MyEndpoint</wsa:To>
  </s12:Header>
  <s12:Body>
    <wsx:Metadata>
      <wsx:MetadataSection Dialect='http://aaa.bbb.com/printer/DeviceData>
       <DeviceData>
            <Manufacturer>xxx company</Manufacturer>
            <ModelName>NetworkPrinter123</ModelName>
       </DeviceID>

</wsx:MetadataSection>
    </wsx:Metadata>
  </s12:Body>
</s12:Envelope>
```

F I G. 20
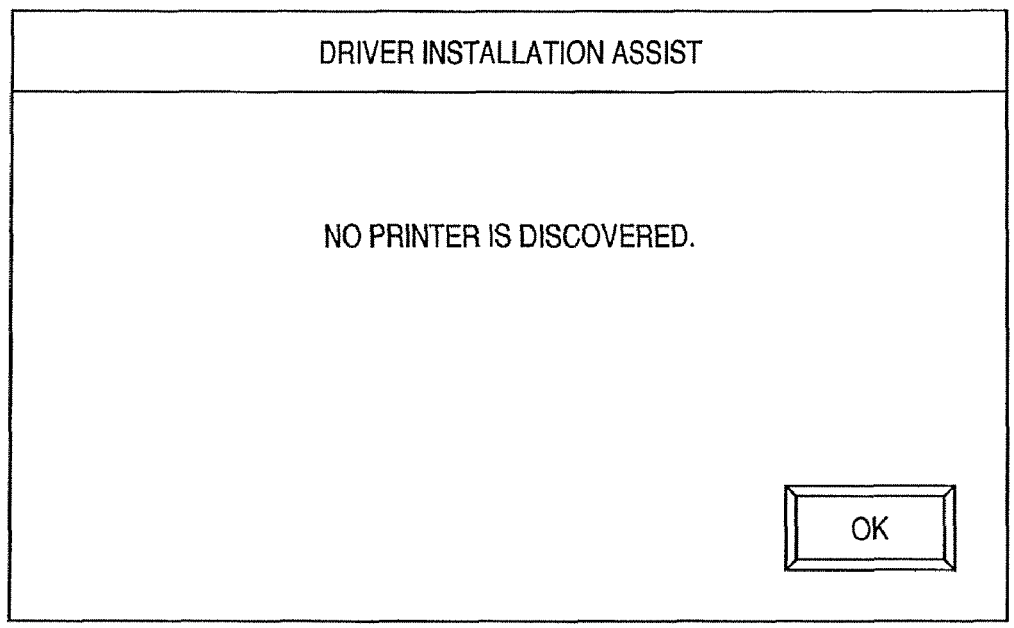

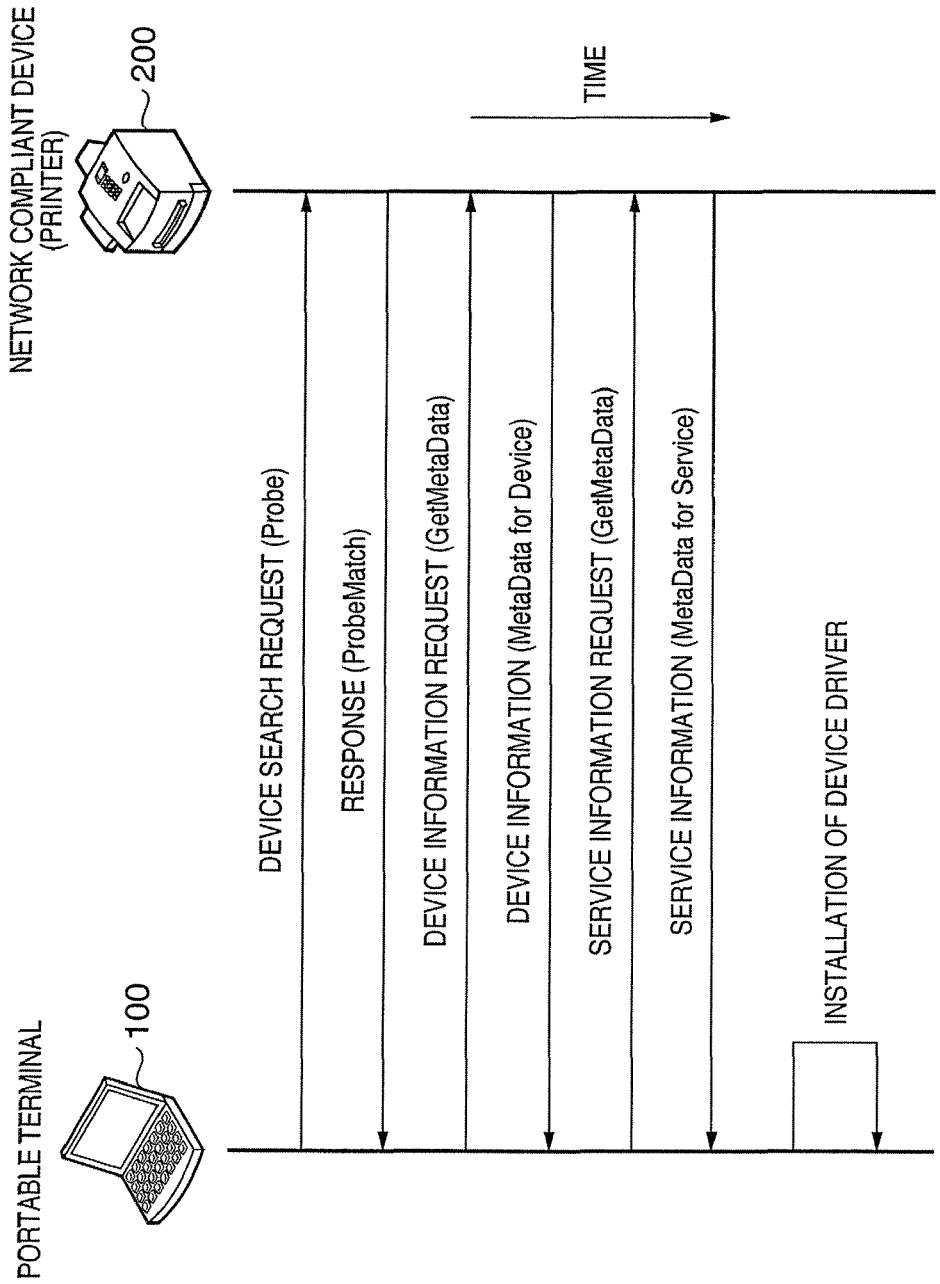

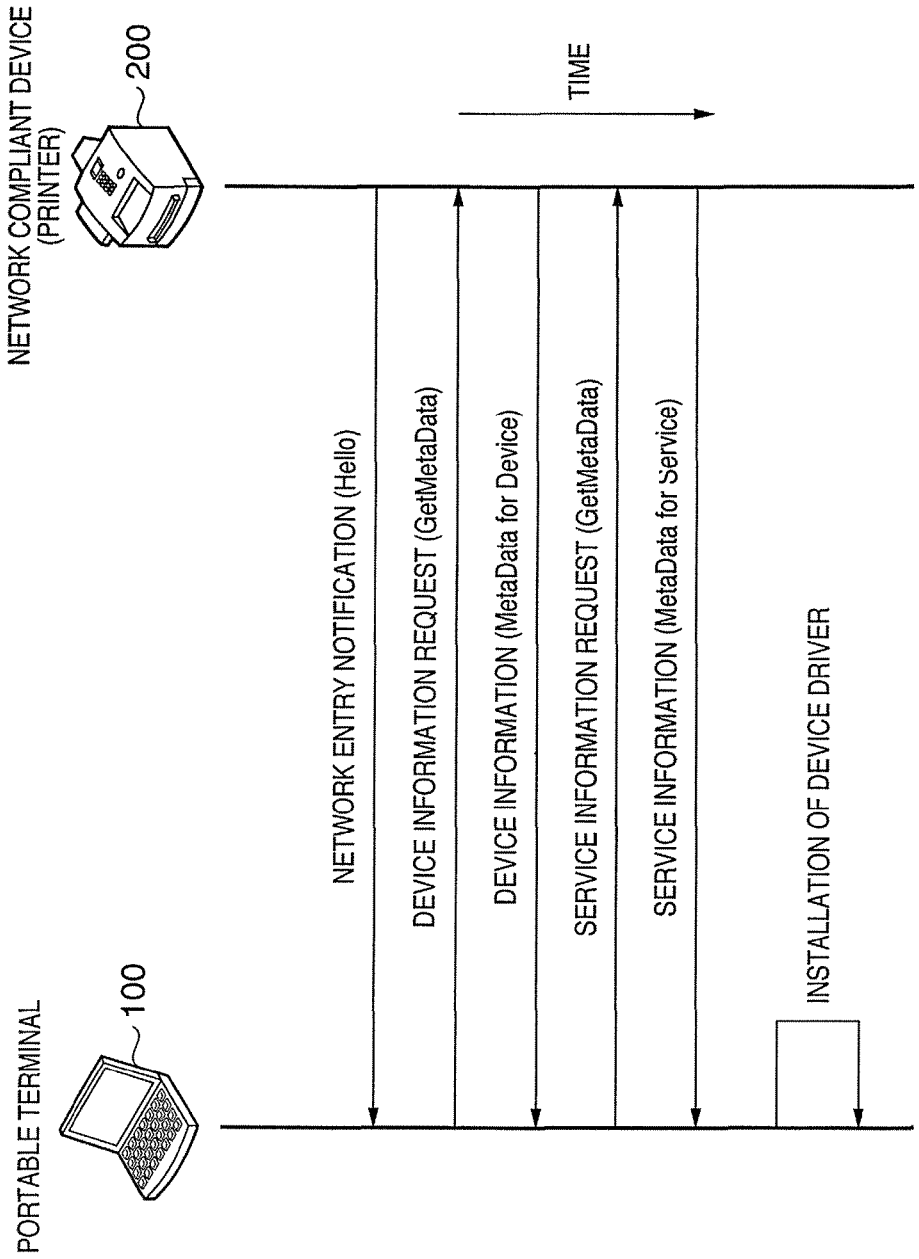

INFORMATION PROCESSING APPARATUS, NETWORK DEVICE, CONTROL METHOD THEREFOR, COMPUTER PROGRAM, AND COMPUTER READABLE STORAGE MEDIUM

BACKGROUND OF THE INVENTION

1. Field of the Invention

The present invention relates to a technique of installing a device driver for controlling a network compliant peripheral device.

2. Description of the Related Art

There have conventionally been known a service providing apparatus and service providing system which meet a service request from a client apparatus on a network. Along with rapid spread of Internet communications, devices of various types have been developed as network compliant devices in addition to a conventional personal computer. Examples of these devices are user interactive devices (e.g., a PDA (Personal Digital Assistance) and cell phone), and image processing apparatuses (e.g., a scanner, printer, copying machine, and digital camera). Even home appliances such as televisions, air conditioners, and refrigerators comply with a network.

With the advance of network compliant devices, a technique of searching for a network device which provides a service has been developed. There is proposed a technique, protocol, and architecture which automatically set up application software, utility software, an operating system, and the like for controlling a network compliant device (e.g., Japanese Patent Laid-Open Nos. 2004-038956, 2004-362594, and 2003-099219).

Companies and standardization groups have proceeded with the establishment of specifications in order to expand Plug and Play technologies(PnP), which has been applied to local I/O connection devices, so as to be used in a network device.

For example, UPnP (Universal Plug and Play) and WSD (Web Services for Devices) have been developed mainly by Microsoft, USA. Other examples of PnP are BMLinkS promoted by Japan Business Machine and Information System Industries Association (JBMIA), and Renedzvous supported by OS X developed by Apple Computer, USA.

It is expected to improve convenience as the network PnP prevails.

A case will be considered where a portable terminal (e.g., a notebook PC, PDA, or cell phone) uses a printer on a given network as a network device. In this case, it is sufficient to install a printer device driver (in this case, a printer driver) corresponding to one printer in the notebook PC.

In this case, however, an adverse effect of a network PnP device is conceivable. An unwanted network device against the user's will is detected in using a portable terminal, and the driver and application of the detected network device may be installed in the portable terminal.

This adverse effect can be easily understood by considering a case where, for example, a notebook personal computer is moved from home or an office at the place of employment and used in a different network configuration such as an office at the visit or at a hot spot in a public facility. In this case, even if the user does not intend to use a network device, the PnP function of the notebook personal computer may discover a network device running in the network configuration. In other words, the driver and application of an unwanted network device may be automatically installed.

As a result, hardware resources, especially, memory resource of a mobile device is uselessly wasted. Software which is not reliable in security may be installed while the user is not aware of it. This may lead to a serious damage such as destruction or leakage of information.

Every time the PnP function of a mobile device such as a notebook PC, PDA, or cell phone discovers a network device, a pop-up message which prompts installation, a warning message, or the like is displayed. When a network contains several ten or several hundred network devices, the user of the mobile device is annoyed with procedures and work to cancel these messages.

SUMMARY OF THE INVENTION

The present invention has been made to overcome the conventional drawbacks, and has as its object to provide a technique capable of automatically installing the device driver of only an intended network device on a network.

In order to solve the above problems, for example, an information processing apparatus according to the present invention comprises the following configuration.

That is, an information processing apparatus which can have network communication means and in which an OS for detecting a network device via the network communication means and automatically installing a corresponding device driver is installed comprises input means for inputting identification information for temporarily recognizing a network device whose device driver is to be installed, determination means for, when a network entry message issued from a network device on a network is received via the network communication means, determining whether identification information which matches the identification information input by the input means is described in the network entry message, and control means for, when the determination means determines that the identification information which matches the identification information input by the input means is not described in the network entry message, controlling to block notification of the network entry message to the OS, and when the determination means determines that the identification information which matches the identification information input by the input means is described in the network entry message, controlling to notify the OS of the network entry message.

A method of controlling an information processing apparatus according to the present invention comprises following arrangement. That is, a method of controlling an information processing apparatus which can have network communication means and in which an OS for detecting a network device via the network communication means and automatically installing a corresponding device driver is installed, comprises an input step of inputting identification information for temporarily recognizing a network device whose device driver is to be installed, a determination step of, when a network entry message issued from a network device on a network is received via the network communication means, determining whether identification information which matches the identification information input in the input step is described in the network entry message, and a control step of, when the identification information which matches the identification information input in the input step is determined in the determination step not to be described in the network entry message, controlling to block notification of the network entry message to the OS, and when the identification information which matches the identification information input in the input step is determined in the determination step to be described in the network entry message, controlling to notify the OS of the network entry message.

A network device according to the present invention comprises following arrangement. That is, a network device which can connect to a network and executes a predetermined process in response to a request from the network, comprises input means for inputting identification information for causing an information processing apparatus in which a device driver is to be installed, to temporarily recognize the network device, first transmission means for transmitting, onto the network, a network entry message which describes the identification information input by the input means, and second transmission means for, when information on the network device is requested from the network, transmitting the requested information as a message to a requesting apparatus.

A method of controlling a network device according to the present invention comprises following arrangement. That is, a method of controlling a network device which can connect to a network and executes a predetermined process in response to a request from the network, comprises an input step of inputting identification information for causing an information processing apparatus in which a device driver is to be installed, to temporarily recognize the network device, a first transmission step of transmitting, onto the network, a network entry message which describes the identification information input in the input step, and a second transmission step of, when information on the network device is requested from the network, transmitting the requested information as a message to a requesting apparatus.

An information processing system according to the present invention comprises following arrangement. That is, an information processing system formed from at least one network device which is connected to a network, and an information processing apparatus which can have network communication means and in which an OS for detecting the network device via the network communication means and automatically installing a corresponding device driver is installed, wherein the information processing apparatus comprises first input means for inputting identification information for temporarily recognizing a network device whose device driver is to be installed, determination means for, when a network entry message issued from a network device on the network is received via the network communication means, determining whether identification information which matches the identification information input by the first input means is described in the network entry message, and control means for, when the determination means determines that the identification information which matches the identification information input by the first input means is not described in the network entry message, controlling to block notification of the network entry message to the OS, and when the determination means determines that the identification information which matches the identification information input by the first input means is described in the network entry message, controlling to notify the OS of the network entry message, and wherein the network device comprises second input means for inputting identification information for causing the information processing apparatus in which the device driver is to be installed, to temporarily recognize the network device, first transmission means for transmitting, onto the network, a network entry message which describes the identification information input by the second input means, and second transmission means for, when information on the network device is requested from the network, transmitting the requested information as a message to a requesting apparatus.

An information processing apparatus according to the present invention comprises following arrangement. That is, an information processing apparatus which can have network communication means and in which an OS for detecting a network device via the network communication means and automatically installing a corresponding device driver is installed, comprises input means for inputting identification information for temporarily recognizing a network device whose device driver is to be installed, determination means for determining whether identification information which matches the identification information input by the input means is described in a response message received after a network device search message which describes information representing a type of network device whose device driver is to be installed is transmitted via the network communication means, and control means for, when the determination means determines that the identification information which matches the identification information input by the input means is not described in the response message, controlling to block notification of the response message to the OS, and when the determination means determines that the identification information which matches the identification information input by the input means is described in the response message, controlling to notify the OS of the response message.

A method of controlling an information processing apparatus according to the present invention comprises following arrangement. That is, a method of controlling an information processing apparatus which can have network communication means and in which an OS for detecting a network device via the network communication means and automatically installing a corresponding device driver is installed, comprises an input step of inputting identification information for temporarily recognizing a network device whose device driver is to be installed;

a determination step of determining whether identification information which matches the identification information input in the input step is described in a response message received after a network device search message which describes information representing a type of network device whose device driver is to be installed is transmitted via the network communication means, and a control step of, when the identification information which matches the identification information input in the input step is determined in the determination step not to be described in the response message, controlling to block notification of the response message to the OS, and when the identification information which matches the identification information input in the input step is determined in the determination step to be described in the response message, controlling to notify the OS of the response message.

A network device according to the present invention comprises following arrangement. That is, a network device which can connect to a network and executes a predetermined service process in response to a request from the network, comprises input means for inputting identification information for causing an information processing apparatus in which a device driver is to be installed, to temporarily recognize the network device;

first transmission means for transmitting, to a source, a response message which describes the identification information input by the input means when a search message for a network device which performs the same service as the service process executed by the network device is received from the network, and second transmission means for, when a request message addressed to the network device for information on the network device is received from the network, transmitting, to a requesting apparatus of the request message, a response message which describes the information requested by the request message.

A method of controlling a network device according to the present invention comprises following arrangement. That is, a method of controlling a network device which can connect to a network and executes a predetermined service process in response to a request from the network, comprises an input step of inputting identification information for causing an information processing apparatus in which a device driver is to be installed, to temporarily recognize the network device, a first transmission step of transmitting, to a source, a response message which describes the identification information input in the input step when a search message for a network device which performs the same service as the service process executed by the network device is received from the network, and a second transmission step of, when a request message addressed to the network device for information on the network device is received from the network, transmitting, to a requesting apparatus of the request message, a response message which describes the information requested by the request message.

An information processing system according to the present invention comprises following arrangement. That is, an information processing system formed from at least one network device which is connected to a network, and an information processing apparatus which can have network communication means and in which an OS for detecting the network device via the network communication means and automatically installing a corresponding device driver is installed, wherein the information processing apparatus comprises first input means for inputting identification information for temporarily recognizing a network device whose device driver is to be installed, determination means for determining whether identification information which matches the identification information input by the first input means is described in a response message received after a network device search message which describes information representing a type of network device whose device driver is to be installed is transmitted via the network communication means, and control means for, when the determination means determines that the identification information which matches the identification information input by the first input means is not described in the response message, controlling to block notification of the response message to the OS, and when the determination means determines that the identification information which matches the identification information input by the input means is described in the response message, controlling to notify the OS of the response message, and wherein the network device comprises second input means for inputting identification information for causing the information processing apparatus in which the device driver is to be installed, to temporarily recognize the network device, first transmission means for transmitting, to a source, a response message which describes the identification information input by the second input means when a search message for a network device which performs the same service as the service process executed by the network device is received from the network, and second transmission means for, when a request message addressed to the network device for information on the network device is received from the network, transmitting, to a requesting apparatus of the request message, a response message which describes the information requested by the request message.

An information processing apparatus which can have network communication means and in which an OS for detecting a network device via the network communication means and automatically installing a corresponding software is installed, comprises input means for inputting identification information for temporarily recognizing a network device which is corresponding to software to be installed;

determination means for, when a network entry message issued from a network device on a network is received via the network communication means, determining whether identification information which matches the identification information input by the input means is described in the network entry message; and control means for, when the determination means determines that the identification information which matches the identification information input by the input means is not described in the network entry message, controlling to block notification of the network entry message to the OS, and when the determination means determines that the identification information which matches the identification information input by the input means is described in the network entry message, controlling to notify the OS of the network entry message.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the schematic configuration of a network Plug and Play system in an embodiment;

FIG. 3 is a view showing an identification ID input user interface displayed by a client terminal in the embodiment;

FIG. 5 is a view showing the format of a Hello message issued from the network compliant device in the embodiment;

FIG. 6 is a view showing the format of a GetMetadata message defined by WS-MetadataExchange specifications;

FIG. 7 is a view showing the format of a GetMetadataResponse message defined by the WS-MetadataExchange specifications;

FIG. 10 is a view showing a normal installation assist end message displayed by the network compliant device in the embodiment;

FIGS. 11A, 11B and 11C are flowcharts showing process procedures until installation of a device driver on the basis of a Probe message in the embodiment;

FIG. 14 is a view showing the format of a Probe message defined by WS-Discovery specifications;

FIG. 15 is a view showing the format of a Probe Match message defined by the WS-Discovery specifications;

FIG. 16 is a view showing the format of a GetMetadata message defined by the WS-MetadataExchange specifications;

FIG. 17 is a view showing the format of a GetMetadataResponse message defined by the WS-MetadataExchange specifications;

FIG. 20 is a view showing an example of an error generation message displayed by the client terminal;

FIGS. 21A and 21B are charts showing a general sequence from discovery of a UPnP network device up to installation of its device driver.

DESCRIPTION OF THE EMBODIMENTS

An information processing apparatus and network device according to the present invention will be first described in brief.

Figure 22:
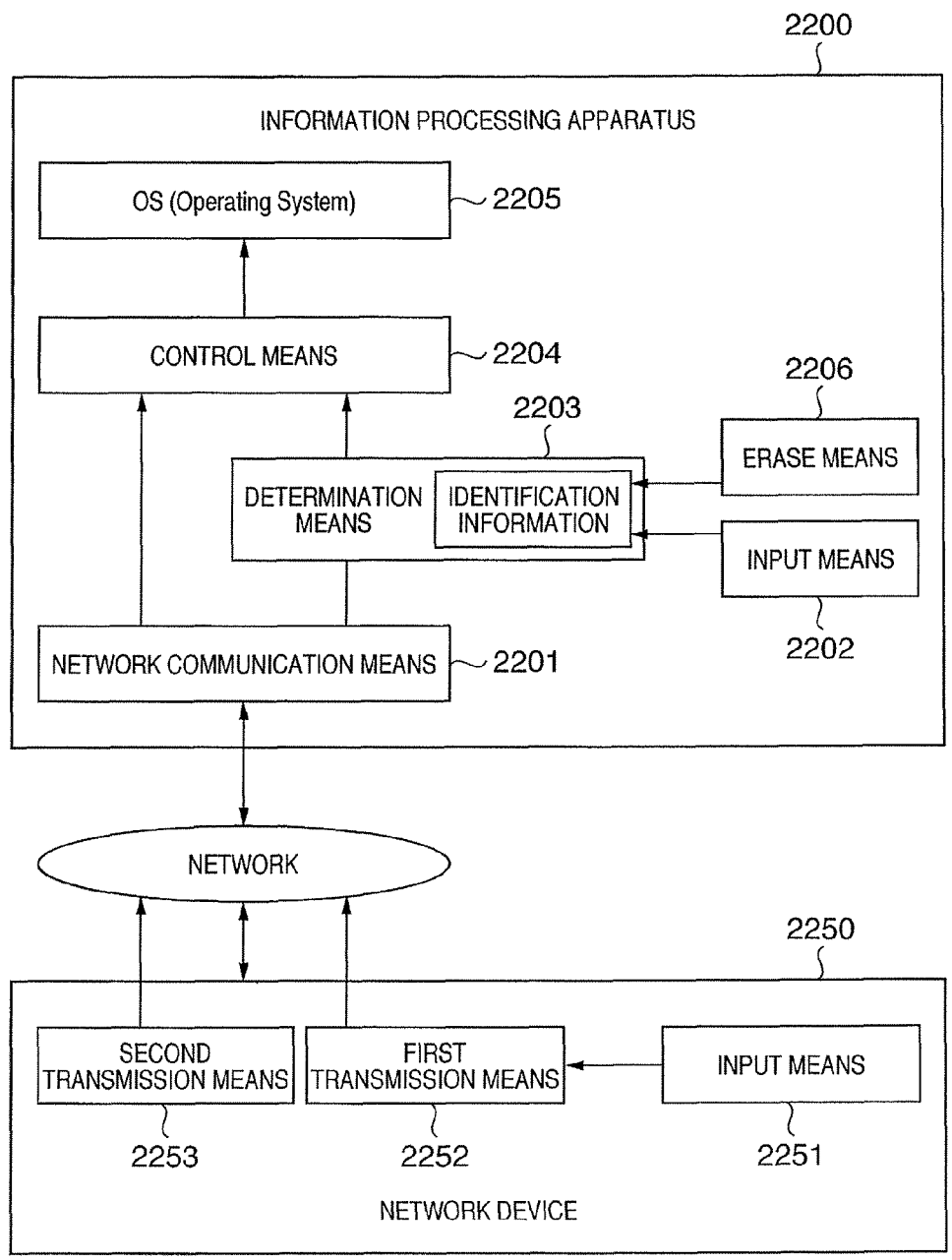
FIG. 22 is a block diagram showing the functional configurations of an information processing apparatus and network device according to the present invention.

FIG. 22 is a block diagram showing the functions of the information processing apparatus and network device according to the present invention. As shown in FIG. 22, an information processing apparatus 2200 according to the present invention mounts or can mount a network communication means 2201. An OS (Operating System) 2205 for detecting a network device 2250 via the network communication means 2201 and automatically installing a corresponding device driver is installed in the information processing apparatus 2200 according to the present invention.

The information processing apparatus 2200 according to the present invention comprises an input means 2202 for inputting identification information for temporarily recognizing the network device 2250 whose device driver is to be installed, a determination means 2203 for, when a network entry message(Hello message) issued from the network device 2250 on a network is received via the network communication means 2201, determining whether identification information which matches the identification information input by the input means 2202 is described in the network entry message, and a control means 2204 for, when the determination means 2203 determines that the identification information which matches the identification information input by the input means 2202 is not described in the network entry message, controlling to block notification of the network entry message to the OS 2205, and when the determination means 2203 determines that the identification information which matches the identification information input by the input means 2202 is described in the network entry message, controlling to notify the OS 2205 of the network entry message.

The information processing apparatus 2200 desirably comprises an erase means 2206 for erasing the identification information input by the input means 2202 when a network entry message containing a description which matches input identification information is not received within a predetermined time after input of the identification information by the input means 2202, and when a network entry message containing matched identification information is received.

The network device 2250 can connect to a network and executes a predetermined process in response to a request from the network. The network device 2250 desirably comprises an input means 2251 for inputting identification information for causing an information processing apparatus in which a device driver is to be installed, to temporarily recognize the network device 2250, a first transmission means 2252 for transmitting, onto the network, a network entry message which describes the identification information input by the input means 2251, and a second transmission means 2253 for, when information on the network device is requested from the network, transmitting the requested information as a message to the information processing apparatus 2200 serving as a requesting apparatus.

Several embodiments according to the present invention will be described in detail below with reference to the accompanying drawings. Protocols, versions, addresses, numerical values, and the like in the following description are merely examples, and are not construed to limit the present invention to only them unless otherwise specified.

First Embodiment

FIG. 1 is a block diagram showing the configuration of a network Plug and Play system according to the first embodiment of the present invention.

In FIG. 1, reference numeral 100 denotes a client terminal including a notebook PC, PDA, cell phone and the like for which the communication configuration may frequently change from an office to a home network or a network configuration at the visit. The first embodiment will describe the client terminal 100 as a notebook PC.

The client terminal 100 comprises an Ethernet controller for network communication. The client terminal 100 comprises a TCP/UDP/IP protocol stack 1 on the lowest logical layer via the Ethernet controller. The client terminal 100 comprises an HTTP 2 on the protocol stack to analyze an HTTP request and perform a response process.

A SOAP (Simple Object Access Protocol) processor 3 is arranged on an upper layer above the TCP/UDP/IP protocol stack 1 and HTTP 2. An installation assist utility 4, WSD module 5, utility 9, and application 10 implement bidirectional communication of data described in XML (extensible Markup Language) via the SOAP processor 3.

The installation assist utility 4 controls a driver installation setting UI to store/read out the setting contents in/from a storage device 8 (e.g., a hard disk because the client terminal is a notebook PC in the first embodiment) via a memory controller 6. The installation assist utility 4 notifies the WSD module 5 of identification information used in a response process to a Hello message, and issues a transmission process request for a Probe message to search for a network device.

The WSD module 5 responds, via the SOAP processor 3, to a Hello message transmitted from a network device, on the basis of WS-Discovery specifications, establishment of which has been progressed by Microsoft, USA and the like. The WSD module 5 issues a Probe message to search for a network device. The WSD module 5 acquires attribute information of a network device by issuing a GetMetadata message on the basis of WS-MetadataExchange specifications.

When a network device is discovered by these message processes, the installation assist utility 4 notifies a Plug and Play controller 7 of attribute information of the discovered network device. The Plug and Play controller 7 has a function of loading a corresponding driver and utility software from the storage device 8 via the memory controller 6 on the basis of the attribute information, and installing the driver and utility software in the client terminal 100.

The application 10 is, e.g., a wordprocessor. Assume that the user prints a document edited by the application by a network compliant device 200. In this case, information of the document is transmitted as job data and print data to the network compliant device 200 via a driver and utility installed by the Plug and Play controller 7.

The network compliant device 200 (network compliant printer in the first embodiment) has an Ethernet communication function, and comprises a TCP/UDP/IP protocol stack 11. The network compliant device 200 comprises an HTTP 12 on the protocol stack to analyze an HTTP request and perform a response process.

A SOAP processor 13 is arranged on an upper layer above the TCP/UDP/IP protocol stack 11 and HTTP 12. An installation assist utility 14, WSD module 15, and printer controller 16 implement bidirectional communication of data described in XML via the SOAP processor 13.

The installation assist utility 14 controls a driver installation setting UI to store the setting contents in a storage device 18 via a memory controller 17 and read out/erase them from the storage device 18.

The installation assist utility 14 notifies the WSD module 15 of identification information used in a Hello message transmission process to the WSD module 15 and a response process to a Probe message to search for a network device.

The WSD module 15 performs, via the SOAP processor 13, a process based on the WS-Discovery specifications, establishment of which has been pushed forward by Microsoft, USA and the like. More specifically, the WSD module 15 transmits a Hello message upon connection to a network, and responds to a Probe message issued from the client terminal 100.

The WSD module 15 sends back attribute information of the network compliant device (network compliant printer) 200 on the basis of the WS-MetadataExchange specifications in response to a GetMetadata message issued from the client terminal 100.

Procedures to perform search based on WSD specifications between the client terminal 100 and the network compliant device 200 and install a device driver for the network compliant device 200 will be simply explained with reference to FIGS. 21A and 21B.

FIG. 21A shows procedures when the client terminal 100 is connected to a network or the user inputs an instruction to search for a network device.

The client terminal 100 multicasts (broadcasts) a Probe message serving as a device search request to a network. Upon reception of the Probe message, the network compliant device (network compliant printer in the first embodiment) 200 unicasts a response message (ProbeMatch) to the client terminal 100 in order to respond to the Probe message. After that, transmission and reception are executed by unicast because the client terminal 100 and network compliant device 200 recognize each other as communication partners.

Since the client terminal 100 receives the response message, it can detect the presence of the network compliant device 200 on the network. The client terminal 100 proceeds to the next stage to unicast a device information request message (GetMetaData) to the network compliant device and acquire device information (MetaData for Device). Then, the client terminal 100 transmits a service information request message (GetMetaData), and acquires service information (MetaData for Service).

As a result, the client terminal 100 can obtain the model name and attribute information (information representing that the network compliant device 200 is a printer) of the network compliant device 200. The client terminal 100 can install a corresponding device driver (in this case, a printer driver) in the OS (Operating System).

FIG. 21B shows procedures when the client terminal 100 permits the network compliant device 200 to enter the network upon completion of connection to the network. Note that it can be easily understood that the network compliant device 200 enters the network when the network compliant device 200 is turned on.

The network compliant device multicasts an entry message (Hello) for entering the network. Upon reception of the entry message, the client terminal 100 detects the presence of the network compliant device 200, and transmits a device information request message. Subsequent procedures are the same as those in FIG. 21A.

In this manner, the client terminal 100 detects an unknown network compliant device, and a corresponding device driver is automatically installed, reducing the burden on the user. However, if the client terminal 100 is moved from a small-scale LAN configuration at home or the like to an in-house LAN configuration in which many network compliant devices exist, it detects many devices in either of the cases of FIGS. 21A and 21B. This means that many device drivers are installed one after another. The time taken to install one device driver is several ten sec to several min, and a long time is required until the user can perform intended work using the client terminal 100. In addition, the memory is consumed by unwanted device drivers, and intended work may be inhibited.

The first embodiment solves this problem by promising that only the device driver of one network compliant device desired by the user is installed in the client terminal 100.

Figure 2A:
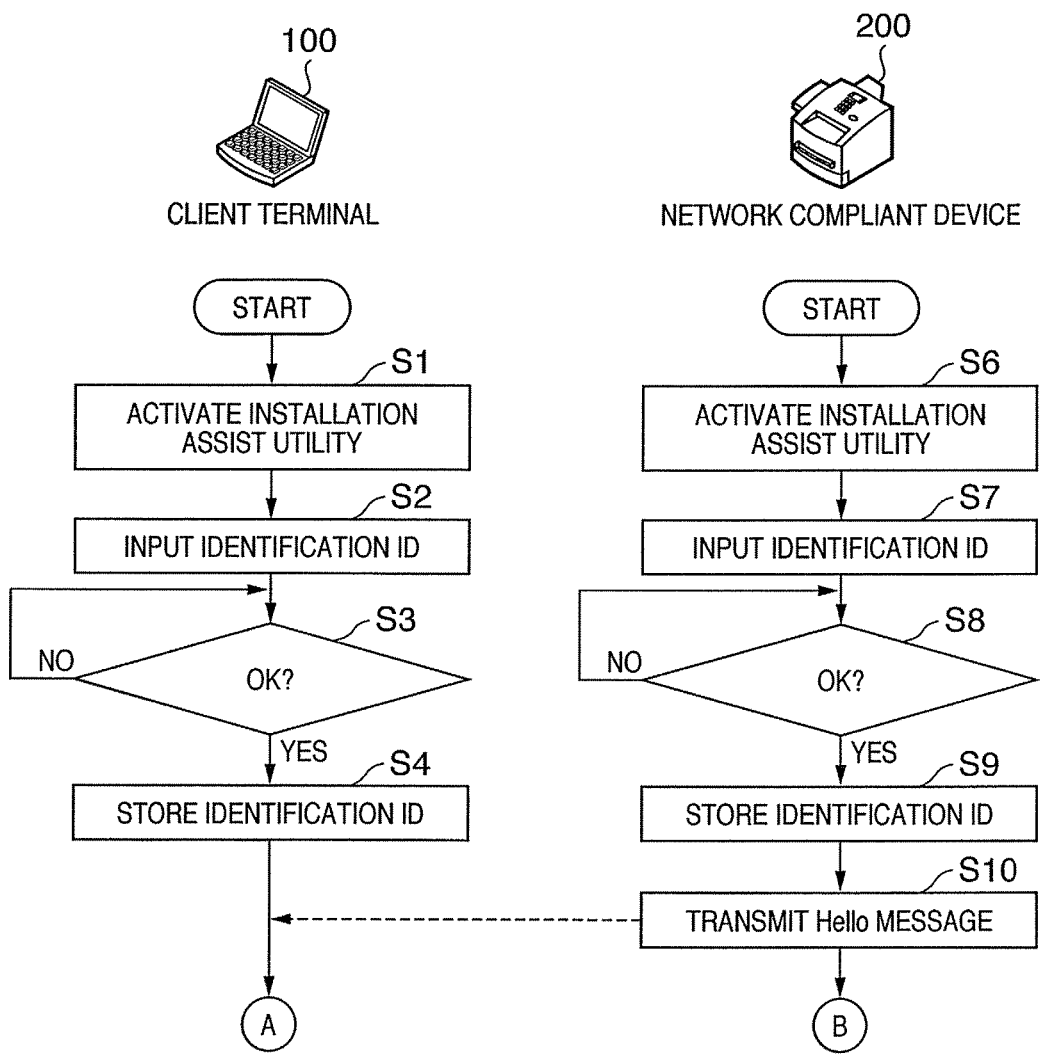
FIGS. 2A, 2B and 2C are flowcharts showing process procedures until installation of a device driver on the basis of a Hello message in the embodiment.
Figure 2B:
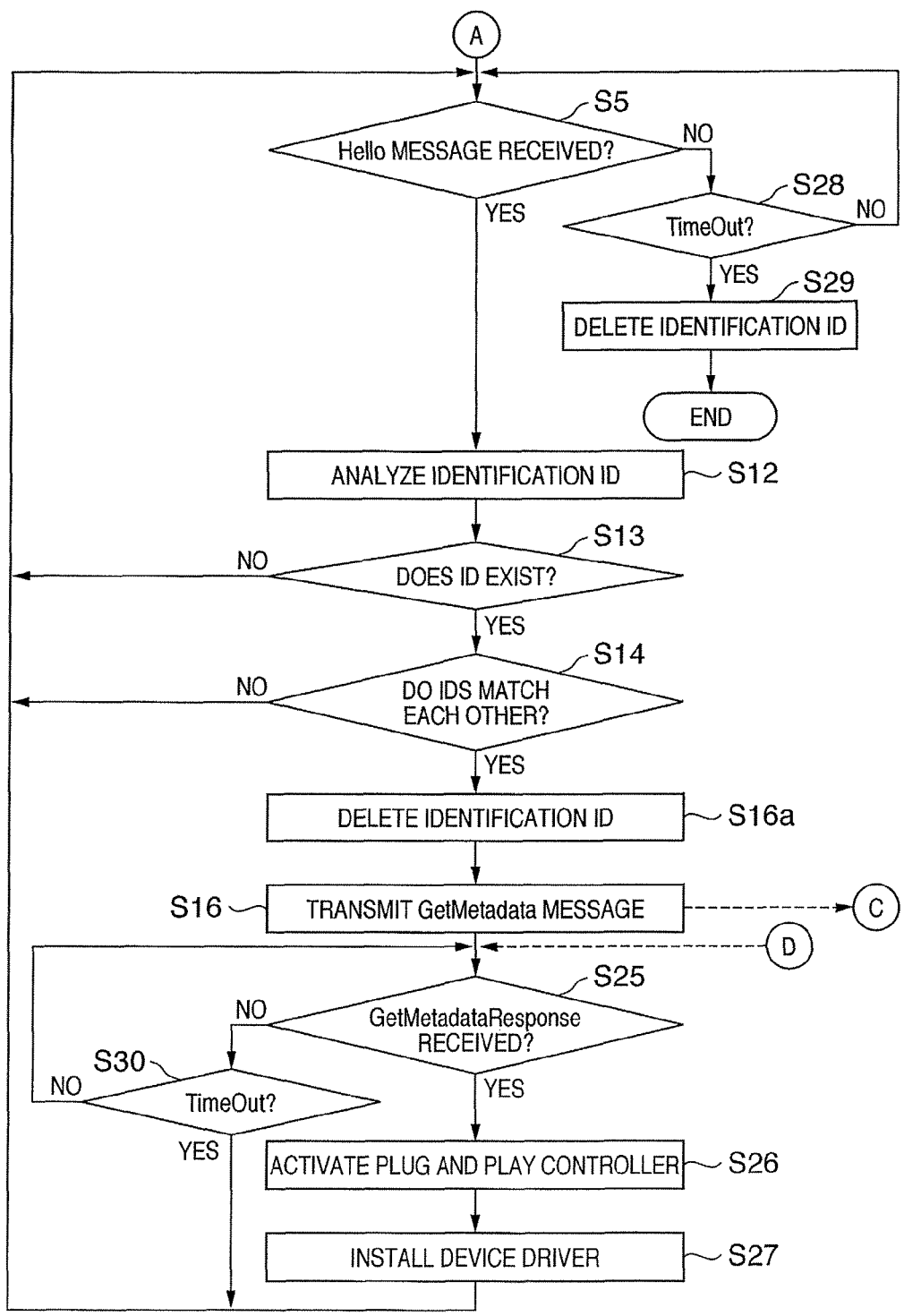
Figure 2C:
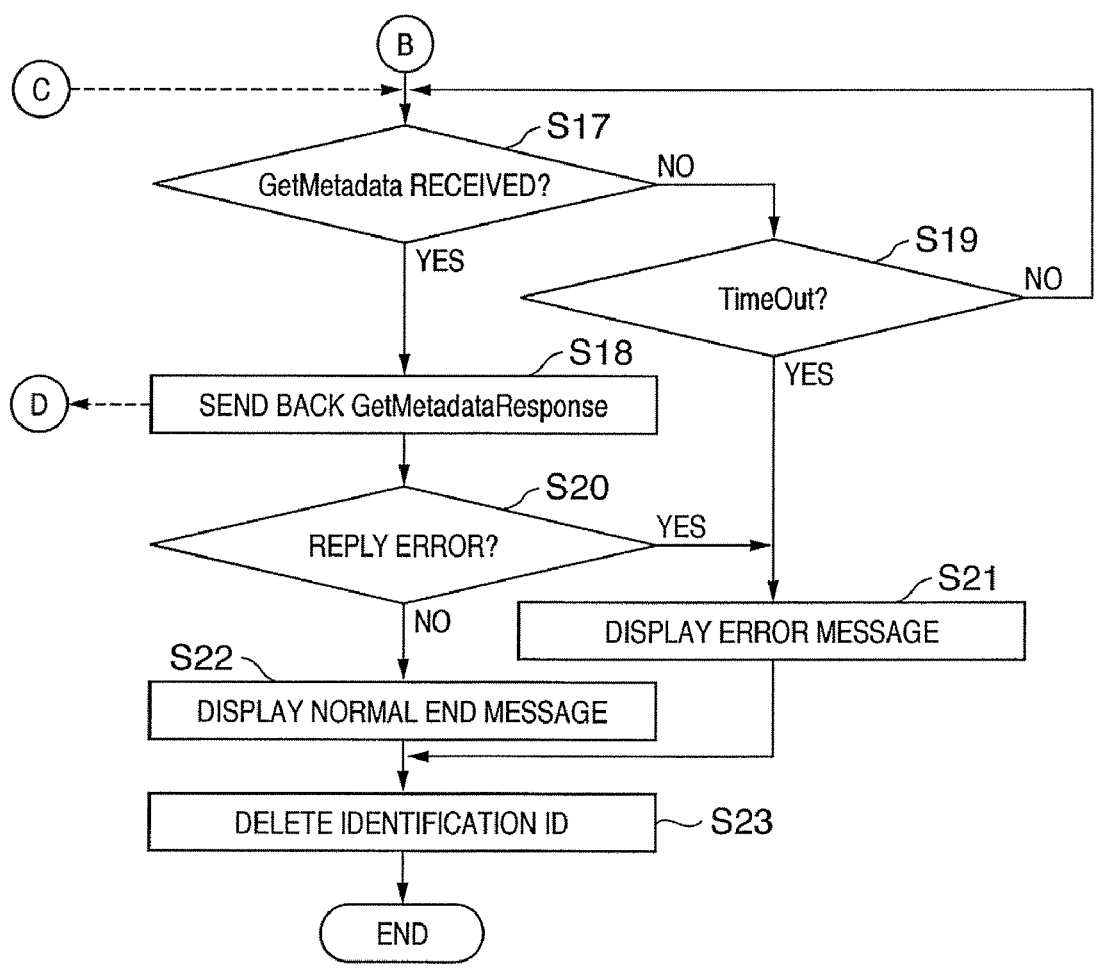

The flow of control according to the present invention will be explained with reference to the flowchart of FIGS. 2A-2C. In the following description, the device driver to be installed is one for the network compliant device 200 shown in FIG. 1.

In order to use the network compliant device 200 from the client terminal 100, the user activates the installation assist utility 4 (step S1).

FIG. 3 shows a user interface window displayed on the display unit of the client terminal 100 when the installation assist utility 4 is activated. The user interface window prompts the user to input a temporary identification ID of up to 10 characters (step S2). In the first embodiment, inputtable characters are figures of 0 to 9, and alphabet letters of a to z and A to Z. The user can input an arbitrary character string.

Upon completion of inputting the identification ID, the user presses (clicks) the OK button with a pointing device (e.g., a mouse: not shown) (step S3). Then, the installation assist utility 4 stores the identification ID in the storage device 8 (e.g., a hard disk or main storage device) via the memory controller 6 (step S4). Thereafter, the client terminal 100 waits for reception of a Hello message transmitted from the network compliant device 200 (step S5).

The user goes to the installation place of the network compliant device 200 for use. Then, the user operates the operation panel of the network compliant device 200, and activates the installation assist utility 14 in the network compliant device 200 (step S6).

Figure 4:
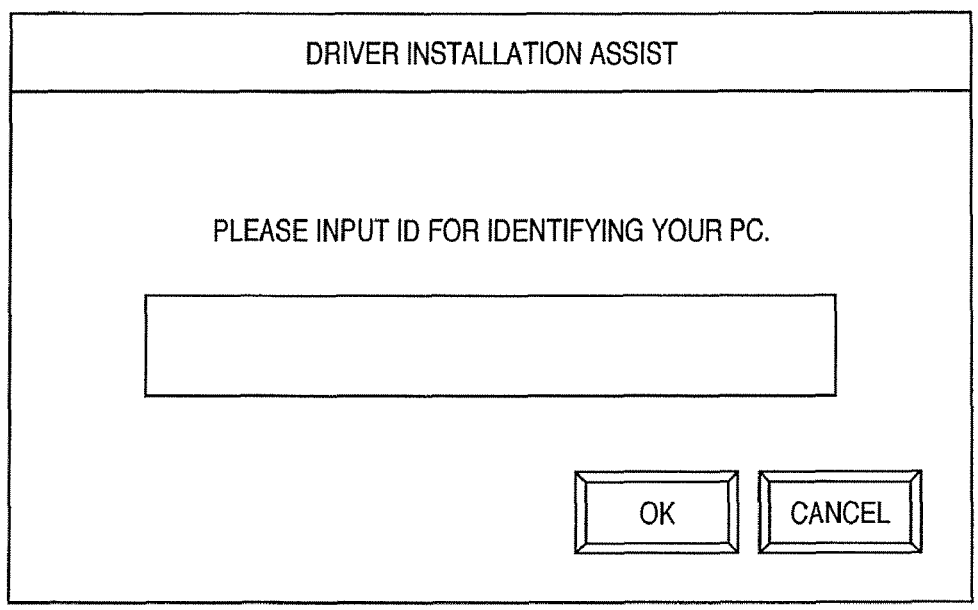
FIG. 4 is a view showing an identification ID input user interface displayed by a network compliant device in the embodiment.

FIG. 4 shows a user interface window displayed on the operation panel (e.g., liquid crystal display) of the network compliant device 200 when the installation assist utility 14 is activated. This window displays a message to prompt the user to input the same character string as the identification ID input in step S2 (step S7). Note that the network compliant device 200 in the first embodiment has a function of inputting 0 to 9, a to z, and A to Z. Although these figures and characters may be input from a physical keyboard, the operation panel is designed as a touch panel and displays a virtual keyboard to prompt the user to input a character string. In some cases, when the user inputs an ID to the client terminal 100, he may store the ID in a portable storage medium (e.g., a memory card or flexible disk) and set the portable storage medium in the network compliant device 200 to input the ID information.

Upon completion of inputting the identification ID to the network compliant device 200, the user presses the OK button (step S8). In this case, the installation assist utility 14 stores the identification ID in the storage device 18 via the memory controller 17 (step S9). The installation assist utility 14 notifies the WSD module 15 of the identification ID information.

Upon reception of the identification ID information, the WSD module 15 notifies the SOAP processor 13 of the identification ID information, and requests the SOAP processor 13 to transmit a Hello message. The SOAP processor 13 generates a Hello message which describes the identification ID on the basis of the WS-Discovery specifications, and multicasts the Hello message to a multicast address 239.255.255.250 via the protocol stack (step S10).

The Hello message is described in XML-SOAP. FIG. 5 shows an example of the message format of the Hello message. The input identification ID information is described on a line sandwiched between tags <Type> and </Type> in the message. In FIG. 5, the identification ID is "123456myid".

When there are a plurality of network compliant devices for use, the user executes steps S6 to S8 for each network compliant device.

Consequently, the SOAP processor 3 is notified of the Hello message via the TCP/UDP/IP protocol stack 1 of the client terminal 100. The SOAP processor 3 analyzes the contents of the Hello message, and notifies the installation assist utility 4 of information described in the message (step S12).

The installation assist utility 4 checks the presence/absence of the identification ID in the notified information (step S13), and determines whether the identification ID information is described. If no identification ID information is described, the installation assist utility 4 discards the received Hello message (does not notify any upper process of the Hello message), and the flow returns to step S5.

If the installation assist utility 4 determines that the identification ID information exists, it reads out the identification ID information stored in the storage device 8 (information stored in step S4) via the memory controller 6. The installation assist utility 4 compares the readout identification ID information with the identification ID (identification ID information contained in the received Hello message) notified by the SOAP processor 3 (step S14).

If the two identification IDs do not match each other, the installation assist utility 4 stops the process and discards the received Hello message, and the flow returns to step S5. That is, the installation assist utility 4 blocks notification of the information acquired from the SOAP processor 3 to the WSD module 5.

If the two identification IDs match each other, the flow advances to step S16a to delete the identification ID information input in the preceding step S2, and advances to step S16. In step S16, in order to acquire, via the WSD module 5, attribute information of the network compliant device 200 that has transmitted the Hello message, the installation assist utility 4 notifies the WSD module 5 of the information acquired from the SOAP processor 3.

Subsequently, a general process based on the OS is performed. More specifically, the WSD module 5 requests the SOAP processor 3 to issue a GetMetadata message defined by WS-MetadataExchange in order to acquire attribute information of the network device at the source address of the Hello message. The SOAP processor 3 generates a GetMetadata message on the basis of the WS-MetadataExchange specifications. The SOAP processor 3 unicasts the GetMetadata message to the network compliant device 200 via the TCP/UDP/IP protocol stack 1 (step S16). The SOAP processor 3 waits for reception of a GetMetadataResponse message from the network compliant device 200 (step S25).

The GetMetadata message is described in XML-SOAP. FIG. 6 shows an example of the message format of the GetMetadata message.

The network compliant device 200 receives the GetMetadata message transmitted from the client terminal 100. The SOAP processor 13 is notified of the received GetMetadata message via the TCP/UDP/IP protocol stack 11 (step S17).

The SOAP processor 13 analyzes the contents of the GetMetadata message, and notifies the WSD module 15 of the analysis result. In order to send back the designated attribute information to the client, the WSD module 15 requests the SOAP processor 13 to issue a GetMetadataResponse message defined by WS-MetadataExchange.

The SOAP processor 13 generates a GetMetadataResponse message on the basis of the WS-MetadataExchange specifications, and unicasts the GetMetadataResponse message to the client via the protocol stack (step S18).

The GetMetadataResponse message is described in XML-SOAP. FIG. 7 shows an example of the message format of the GetMetadataResponse message.

Figure 8:
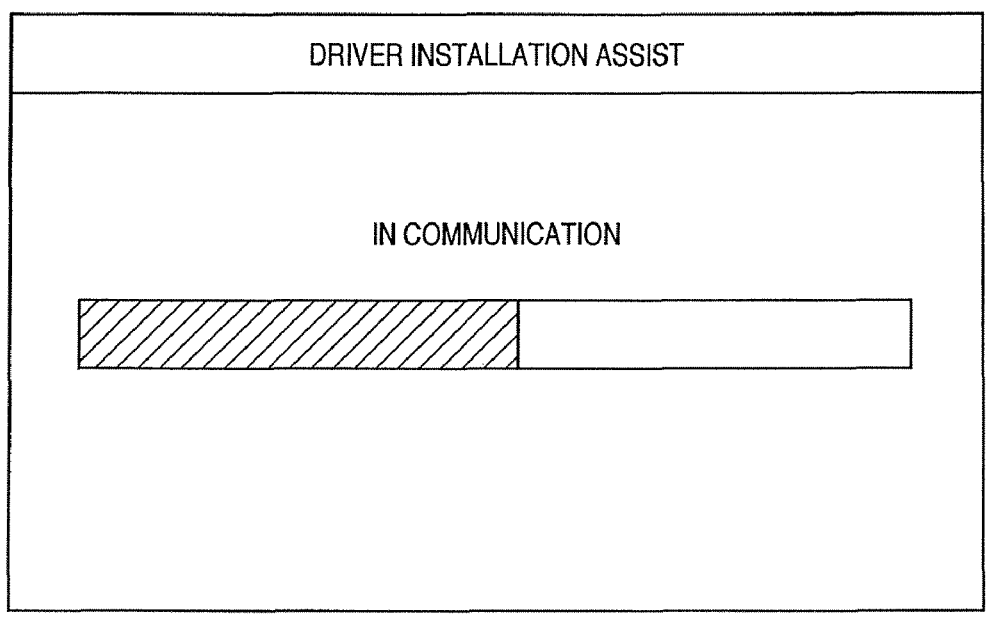
FIG. 8 is a view showing an example of the progress of a communication process that is displayed by the network compliant device in the embodiment.
Figure 9:
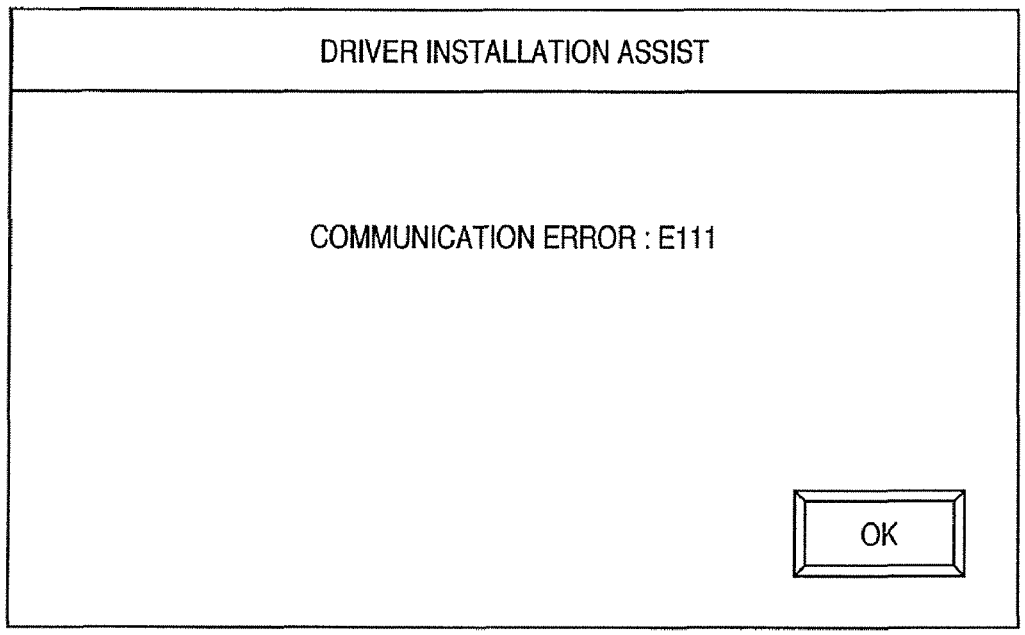
FIG. 9 is a view showing an example of a message which is displayed by the network compliant device upon generation of a communication error in the embodiment.

The installation assist utility 14 displays the progress of the communication process on the operation panel of the network compliant device 200. FIG. 8 shows the progress of the communication process that is displayed on the operation panel by the installation assist utility 14 upon completion of transmitting the GetMetadataResponse message.

If no GetMetadata request is received within a predetermined time (YES in step S19), or a communication error occurs in unicasting GetMetadataResponse to the client terminal 100 (YES in step S20), the installation assist utility 14 displays a message representing the error contents on the operation panel of the network compliant device 200 (step S21). The installation assist utility 14 erases the identification ID stored in the storage device 18 via the memory controller 17 (step S23).

If the network compliant device 200 normally ends transmission of GetMetadataResponse, the installation assist utility 14 displays a normal end message on the operation panel of the network compliant device 200 in a form shown in FIG. 10 (step S22). The installation assist utility 14 erases the identification ID information stored in the storage device 18 via the memory controller 17 (step S23).

If the client terminal 100 receives the GetMetadataResponse message from the network compliant device 200, the SOAP processor 3 is notified of the received GetMetadataResponse message via the TCP/UDP/IP protocol stack 1. The WSD module 5 is notified of the device attribute information described in the GetMetadataResponse message via the SOAP processor 3 of the client terminal 100.

The WSD module 5 activates the Plug and Play controller 7 (step S26), and notifies it of the device attribute information.

Upon reception of the notification, the Plug and Play controller 7 searches the storage device 8 (e.g., hard disk) via the memory controller 6 for a driver corresponding to the device attribute information, and installs the driver (step S27).

The client terminal 100 repeats the process from steps S5 to S27 every time a Hello message is received. If no Hello message is received even upon the lapse of a predetermined time (counted upon completion of inputting identification ID information) (YES in step S28), the installation assist utility 4 erases the identification ID stored in the storage device via the memory controller 6 (step S29), and completes the installation assist process.

The above-described control is repetitively executed from steps S1 to S29. Resultantly, the client terminal 100 can execute the Plug and Play of a device driver (in some cases, a utility or application) for using a network compliant device directly selected by the user.

Figure 11A:
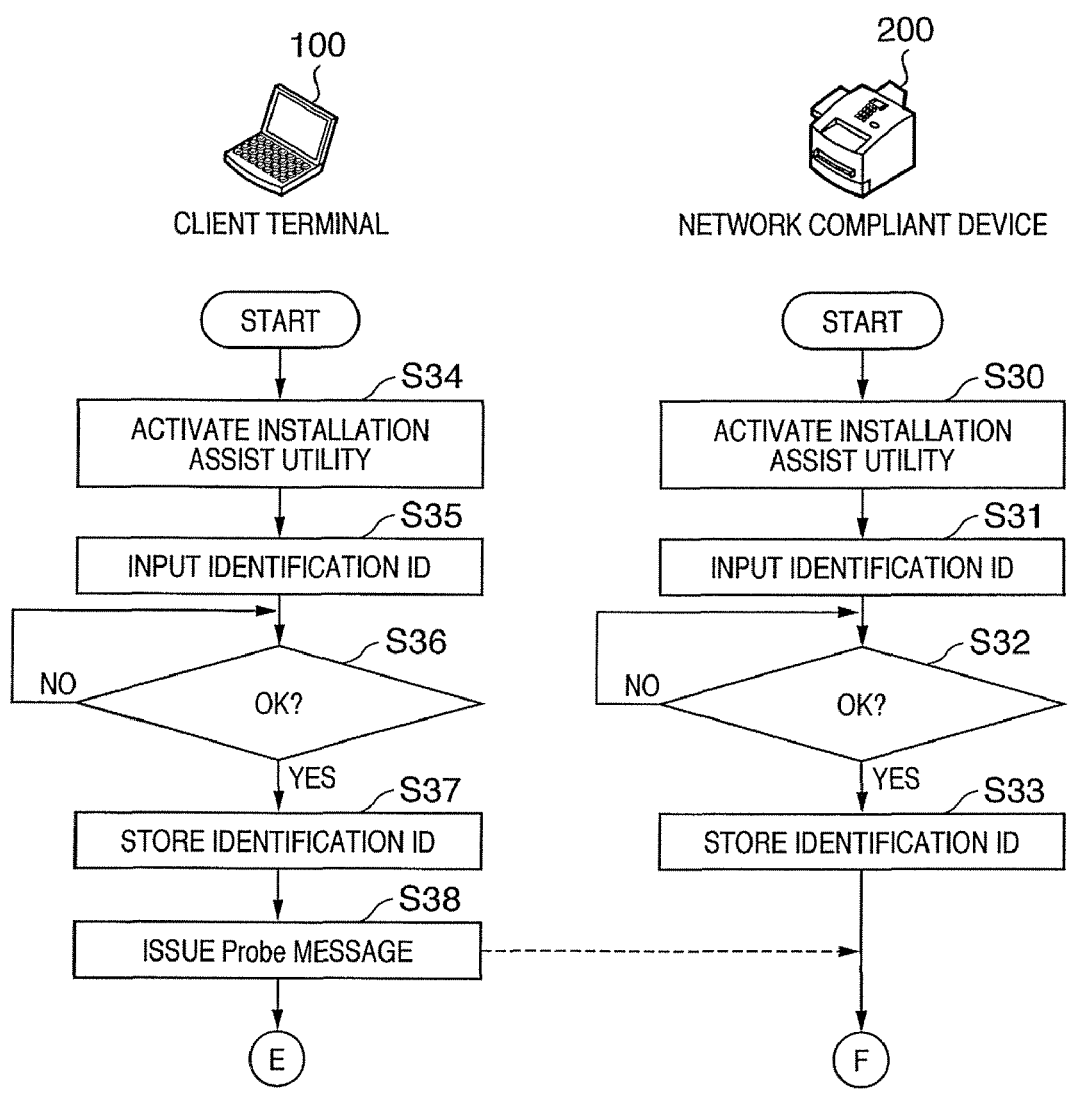
Figure 11C:
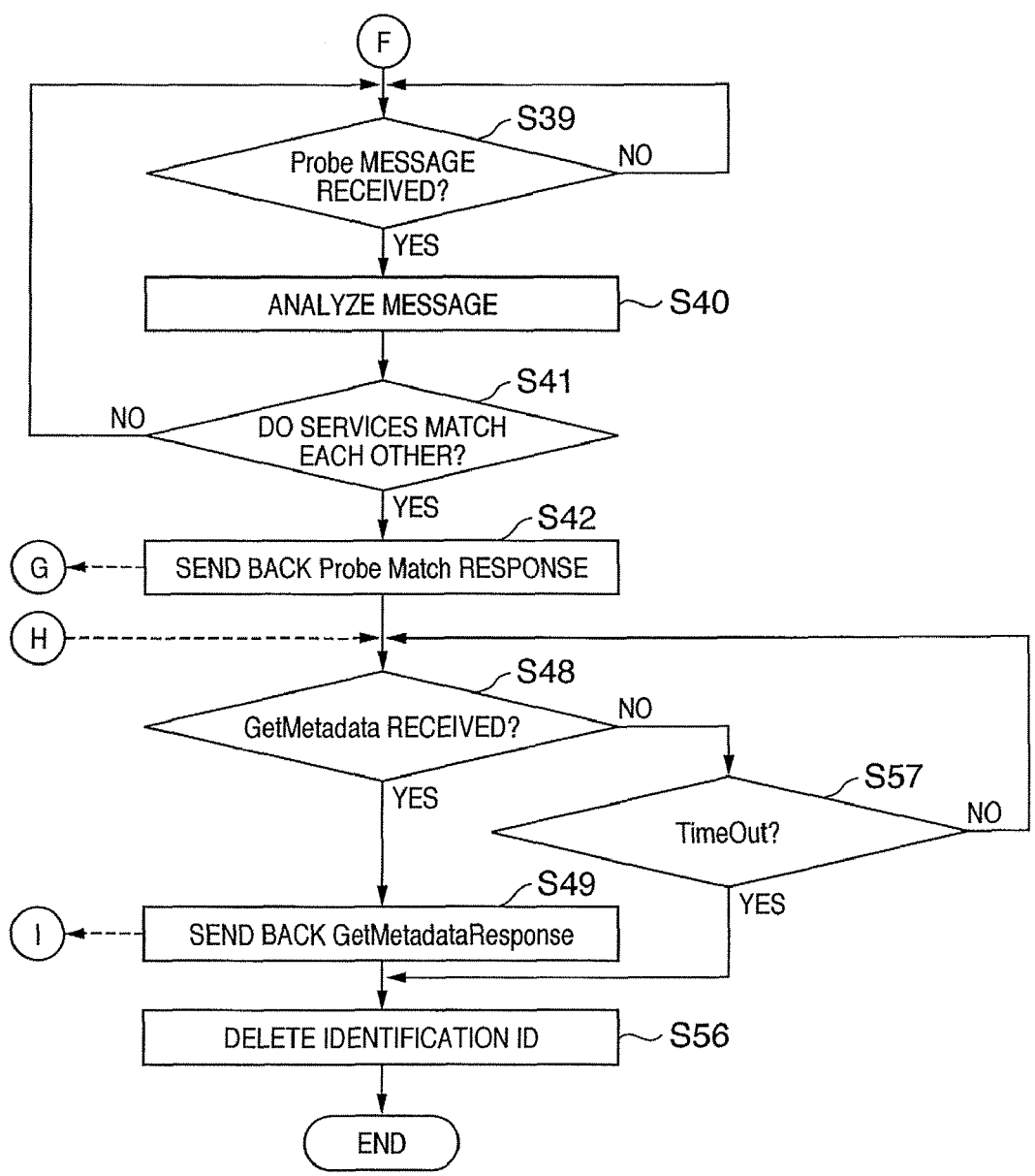

The above process is an example of installing a device driver in accordance with a Hello message transmitted from the network compliant device 200. Next, device driver installation procedures which start in response to a Probe message issued from the client terminal 100 will be explained with reference to the flowcharts of FIGS. 11A-11C. FIGS. 11A-11C show procedures by the installation assist utility 4 of the client terminal 100 and those by the installation assist utility 14 of the network compliant device 200.

The user operates the operation panel of the network compliant device 200 to designate a mode in which the network compliant device 200 responds to Probe from the client terminal 100, and he activates the installation assist utility 14 (step S30).

Figure 12:
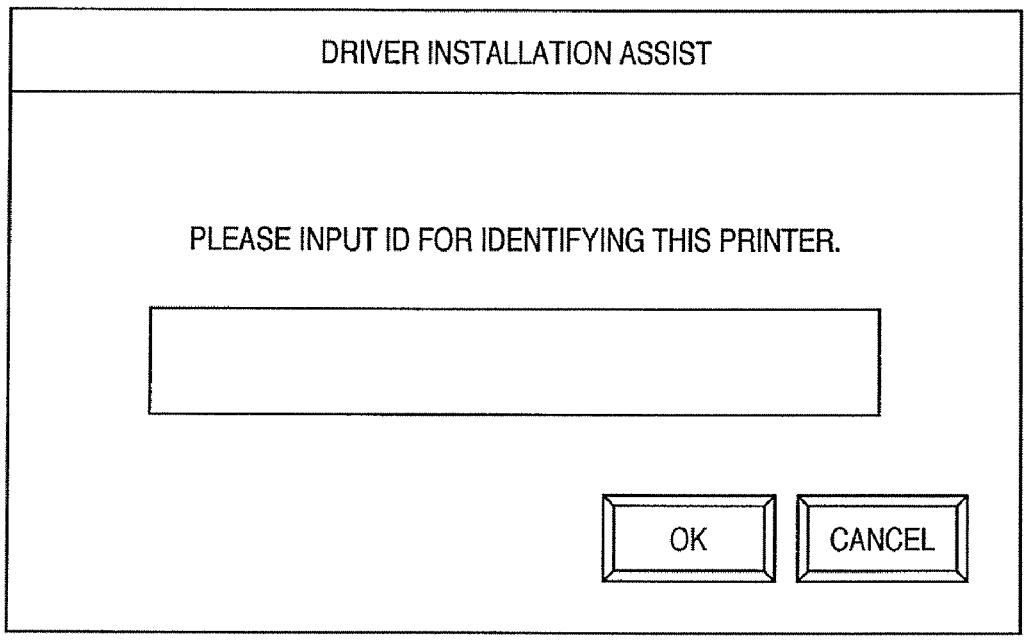
FIG. 12 is a view showing an example of an identification ID input user interface displayed by the network compliant device in accordance with the flowcharts of FIGS. 11A-11C.

FIG. 12 shows a user interface window displayed on the operation panel unit of the network compliant device 200 when the installation assist utility 14 is activated. The user can input an identification ID of up to 10 characters. In the first embodiment, inputtable characters are figures of 0 to 9, and alphabet letters of a to z and A to Z. The input method is the same as that described above.

Upon completion of inputting the identification ID (step S31), the user presses the OK button (step S32). Then, the installation assist utility 14 stores the identification ID in the storage device 18 via the memory controller 17 (step S33). In step S39, the network compliant device 200 waits for reception of a Probe message from the client terminal 100.

The user activates the installation assist utility 4 in the client terminal 100 (step S34).

Figure 13:
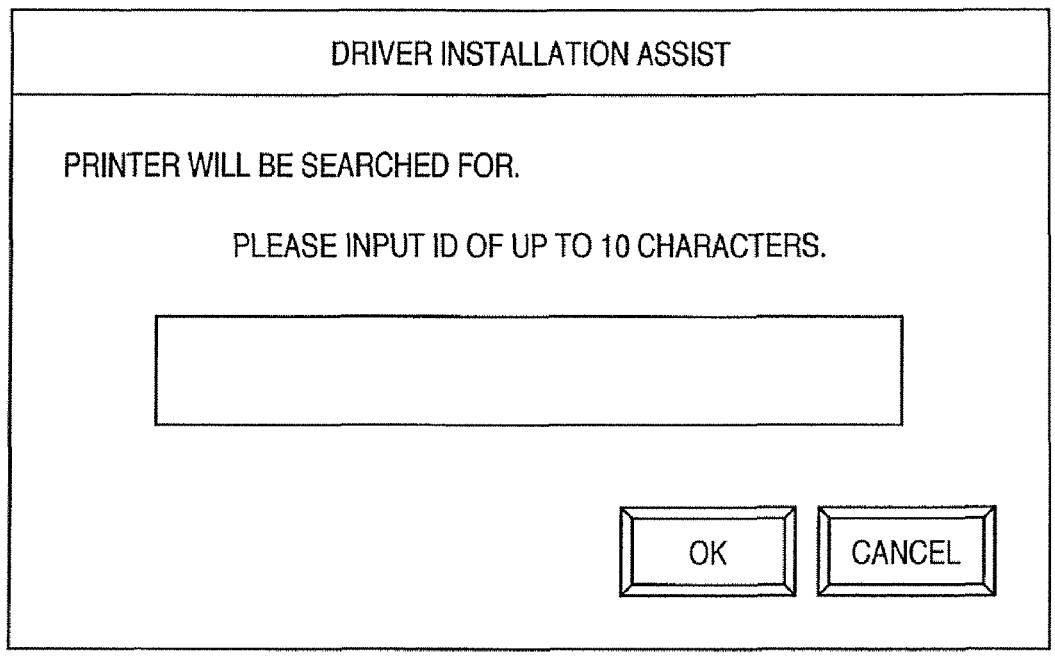
FIG. 13 is a view showing an example of an identification ID input user interface displayed by the client terminal in accordance with the flowcharts of FIGS. 11A-11C.

FIG. 13 shows a user interface window displayed on the display unit of the client terminal 100 when the installation assist utility 4 is activated. The user interface window prompts the user to input the same character string as the identification ID input in step S31 (step S35).

Upon completion of inputting the identification ID information, the user presses the OK button with a pointing device or the like (step S36). Then, the installation assist utility 4 stores the identification ID in the storage device 8 via the memory controller 6 (step S37). The installation assist utility 4 requests the WSD module 5 to transmit Probe defined by the WS-Discovery specifications.

More specifically, the WSD module 5 notifies the SOAP processor 3 of the Probe message transmission request. The SOAP processor 3 generates a Probe message defined by the WS-Discovery specifications. The SOAP processor 3 multicasts the generated Probe message to a multicast address 239.255.255.250 via the TCP/UDP/IP protocol stack 1 (step S38).

The Probe message is described in XML-SOAP. FIG. 14 shows an example of the message format of the Probe message.

If the network compliant device 200 receives the Probe message (step S39), the SOAP processor 13 is notified of the received Probe message via the TCP/UDP/IP protocol stack 11. The SOAP processor 13 analyzes the contents of the Probe message, and notifies the installation assist utility 14 of the analysis result (step S40).

The installation assist utility 14 determines whether the notified message contents match a service function (in this case, a print service) provided by the network compliant device 200 (step S41). If the installation assist utility 14 determines that the notified message contents do not match the service function, the flow returns to step S39 in order to ignore the information. In this case, the network compliant device 200 does not issue any Probe Match response.

If the installation assist utility 14 determines that the notified message contents match the service function, it reads out the identification ID stored in the storage device 18 via the memory controller 17, and notifies the WSD module 15 of the identification ID. The WSD module 15 notifies the SOAP processor 13 of the identification ID, and requests it to issue a Probe Match message which describes the identification ID information. The SOAP processor 13 generates a Probe Match message on the basis of the WS-Discovery specifications, and unicasts the Probe Match message to the client via the TCP/UDP/IP protocol stack 11 (step S42).

The Probe Match message is described in XML-SOAP. FIG. 15 shows an example of the message format of the Probe Match message. As shown in FIG. 15, the identification ID information is described in a SOAP Body part as an attribute of tags <Type> and </Type> in the message.

The SOAP processor 3 is notified of the Probe Match message via the TCP/UDP/IP protocol stack 1 of the client terminal 100. The SOAP processor 3 analyzes the contents of the Probe Match message, and notifies the installation assist utility 4 of information described in the message (step S43).

The installation assist utility 4 checks the presence/absence of the identification ID in the notified information (step S44), and determines whether the identification ID information is described.

If no identification ID information is described, the installation assist utility 4 discards the received Probe Match message, and the flow returns to step S43.

If the installation assist utility 4 determines that the identification ID information exists, it reads out the identification ID information stored in the storage device 8 via the memory controller 6 in order to compare it with the identification ID stored in step S37. The installation assist utility 4 compares the readout identification ID information with the identification ID information notified by the SOAP processor 3.

If the two pieces of identification ID information do not match each other, the installation assist utility 4 discards the received Probe Match message, and the flow returns to step S43.

If the two pieces of identification ID information match each other, the flow advances to step S47a to delete the identification ID information input in the preceding step S35, and to step S47. In step S47, in order to acquire, via the WSD module 5, attribute information of the network compliant device 200 that has transmitted the Probe Match message, the installation assist utility 4 notifies the WSD module 5 of the information acquired from the SOAP processor 3.

After that, a general process by the OS is performed. More specifically, the WSD module 5 requests the SOAP processor 3 to issue a GetMetadata message defined by WS-MetadataExchange in order to acquire attribute information of the network device at the Probe Match source address that has issued the message. In response to the request, the SOAP processor 3 generates a GetMetadata message on the basis of the WS-MetadataExchange specifications, and unicasts the GetMetadata message to the network compliant device 200 via the TCP/UDP/IP protocol stack 1 (step S47).

The GetMetadata message is described in XML-SOAP. FIG. 16 shows an example of the message format of the GetMetadata message.

The network compliant device 200 receives the GetMetadata message, and the SOAP processor 13 is notified of the message via the TCP/UDP/IP protocol stack 11 (step S48). The SOAP processor 13 analyzes the contents of the GetMetadata message, and notifies the WSD module 15 of the analysis result. In order to send back the designated attribute information to the client, the WSD module 15 requests the SOAP processor 13 to issue a GetMetadataResponse message defined by WS-MetadataExchange. The SOAP processor 13 generates a GetMetadataResponse message on the basis of the WS-MetadataExchange specifications, and unicasts the GetMetadataResponse message to the client terminal 100 via the protocol stack (step S49).

The GetMetadataResponse message is described in XML-SOAP. FIG. 17 shows an example of the message format of the GetMetadataResponse message.

Upon completion of transmitting the GetMetadataResponse message, the installation assist utility 14 erases the identification ID information stored in the storage device 18 via the memory controller 17 (step S56), and the process of the installation assist utility 14 is completed.

If no GetMetadata message is received even upon the lapse of a predetermined time (YES in step S57), the installation assist utility 14 erases the identification ID stored in the storage device 18 via the memory controller 17 (step S56), and completes the installation assist process.

If the client terminal 100 receives the GetMetadataResponse message, the SOAP processor 3 is notified of the message via the TCP/UDP/IP protocol stack 1 (step S50).

The WSD module 5 is notified of the device attribute information described in the GetMetadataResponse message via the SOAP processor 3 of the client terminal 100.

In step S51, the WSD module 5 activates the Plug and Play controller 7, and notifies it of the device attribute information. Upon reception of the notification, the Plug and Play controller 7 searches the storage device 8 via the memory controller 6 for a driver corresponding to the device attribute information, and installs the driver (step S52).

Figure 18:
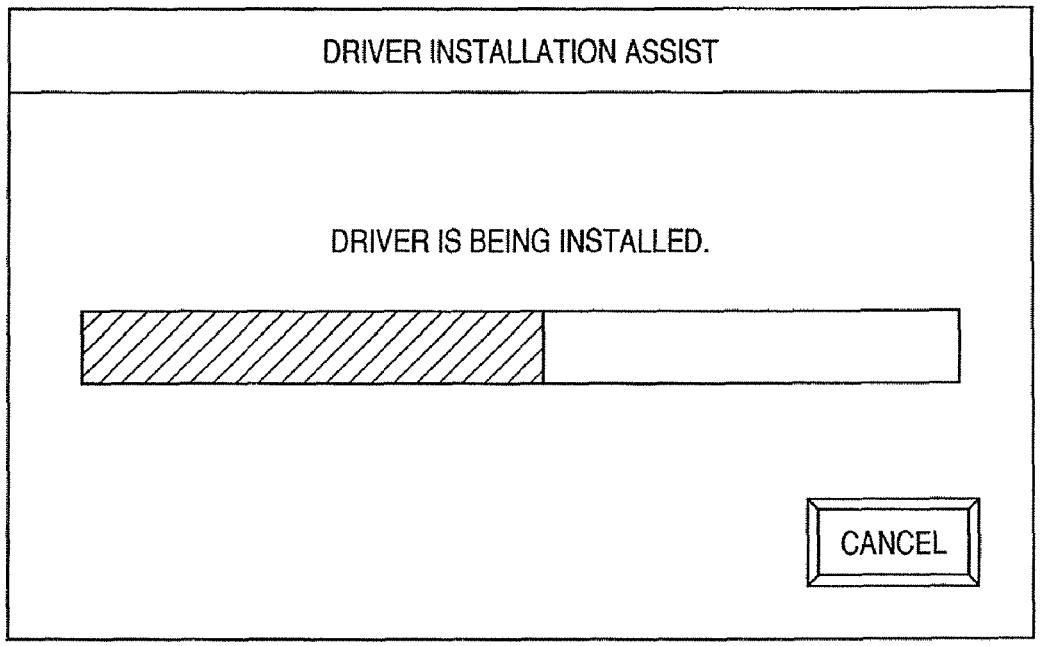
FIG. 18 is a view showing the progress of a process that is displayed by the client terminal.
Figure 19:
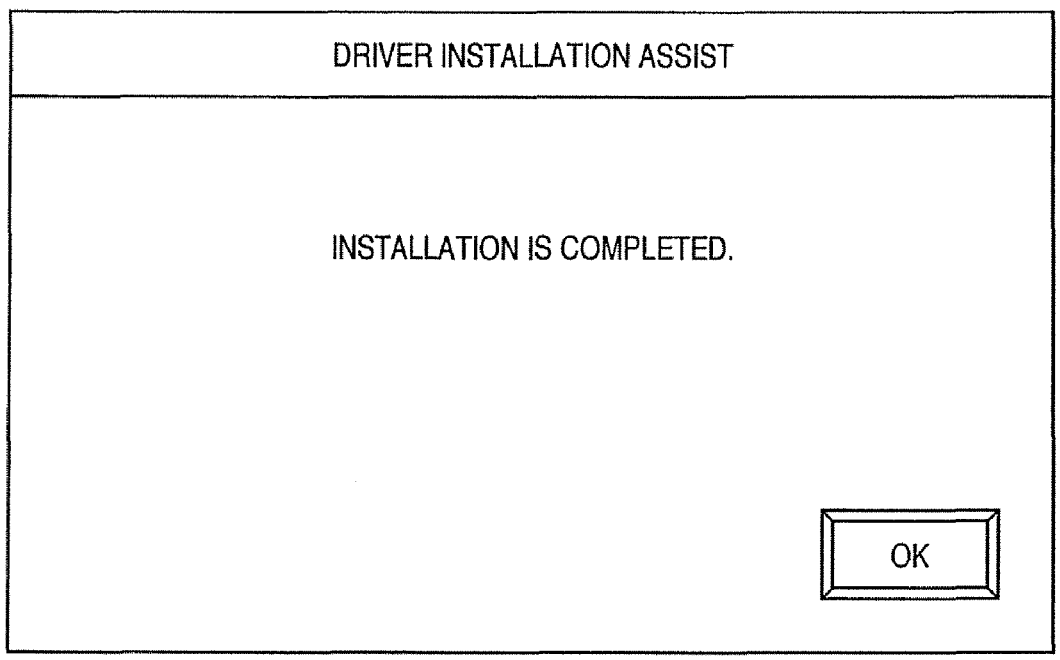
FIG. 19 is a view showing an example of a normal installation assist end message displayed by the client terminal.

The installation assist utility 4 displays the progress of the process shown in steps S43 to S52 on the display unit of the client terminal 100 in a form shown in FIG. 18. If installation of the driver is normally completed, the installation assist utility 4 displays a message of a form shown in FIG. 19 on the display unit of the client terminal 100.

If the client terminal 100 does not receive any GetMetadataResponse message issued from the network compliant device even upon the lapse of a predetermined time (YES in step S55), the installation assist utility 4 displays, in a form shown in FIG. 20 on the operation panel, a message representing that no network compliant device can be discovered.

The client terminal 100 repeats the process from steps S34 to S52 until all Probe Match responses are received.

If the client terminal 100 does not receive any Probe Match message issued from the network compliant device 200 even upon the lapse of a predetermined time after the Probe message is issued in step S38 (YES in step S53), the installation assist utility 4 erases the identification ID stored in the storage device 8 via the memory controller 6 (step S54), and completes the installation assist process.

By repetitively executing the above-described control from steps S30 to S56, the client terminal 100 executes the Plug and Play of a driver, utility, or application for using a network compliant device directly selected by the user.

According to the first embodiment, identification ID information (also called recognition information) set in the client terminal 100 and network compliant device 200 is a character string which can be temporarily arbitrarily set, and no knowledge on a particular network technique is required.

Other Embodiment

The above-described embodiment adopts a protocol defined by WS-Discovery in order to search for a network device and issue a notification representing that a network device enters a network, but the present invention is not limited to this protocol. For example, the present invention can also be implemented using, e.g., SSDP (Simple Service Discovery Protocol) and GENA (General Event Notification Architecture) defined by UPnPv1. The network device search protocol is arbitrary as far as an address for acquiring attribute information of a network device is utilized and a control information transmission destination for controlling a network device can be acquired.

The above-described embodiment implements a communication medium using Ethernet. However, the present invention can also be applied to a network using Wi-Fi (IEEE80.11a/b/g) or Bluetooth or to a local I/O as far as the communication medium can discover a device and notify the partner that the device starts executing its function.

As an example of the Plug and Play, the above embodiment has described installation of a driver corresponding to a discovered network device. However, the present invention can also be applied to a case where a utility, application, or the like necessary to utilize and control a network device is automatically installed in the client terminal 100.

The above embodiment has described a mounting example of a printer as a network device. However, the present invention can also be applied to, e.g., a scanner, a storage device, a facsimile apparatus, or a multifunctional device of them as far as the device can be used and controlled via a communication medium.

In the above-described embodiment, the client terminal 100 holds, in the memory, a driver for controlling a network device. However, the present invention is not limited to the driver, and can also be applied to an application and utility software. Further, the present invention can also be applied to a case where the software is held in a network device or another server.

The above-described embodiment uses an identification ID arbitrarily set by the user. However, in order to avoid setting of the same identification ID by a plurality of users by accident, the present invention can also be applied to a form in which an identification ID is generated at random by the installation assist and used.

The process functions in the client terminal 100 and network compliant device 200 according to the above-described embodiment are implemented by reading out programs for implementing the process functions from the memory and executing them by the CPU (Central Processing Unit). However, the present invention is not limited to this, and all or some of the process functions may be implemented by dedicated hardware. The above-mentioned memory may be formed from a magnetooptical disk, a nonvolatile memory (e.g., flash memory), a read-only storage medium (e.g., CD-ROM), a volatile memory other than a RAM, or a computer readable/writable recording medium of a combination of them.

The respective processes may be performed by recording, on a computer readable recording medium, programs for implementing functions in the client terminal 100 and network compliant device 200, loading the programs recorded on the recording medium into the computer system, and executing the programs. In this case, the "computer system" includes an OS and hardware such as a peripheral device. More specifically, the present invention includes a case where, after a program read out from a storage medium is written in the memory of a function expansion board inserted into the computer or the memory of a function expansion unit connected to the computer, the CPU of the function expansion board or function expansion unit performs some or all of actual processes on the basis of the instructions of the program and thereby implements the functions of the above-described embodiment.

Especially, the client terminal 100 requires network interface hardware, but implements the functions described in the above embodiment by a computer program. In general, an application program is stored in a computer readable storage medium such as a CD-ROM. The functions can be executed by setting the computer readable storage medium in a computer loadable reading device (e.g., a CD-ROM driver) and copying or installing the program in the system. Hence, the computer readable storage medium apparently falls within the scope of the present invention.

According to the present invention, only when a message describing information which matches input temporary recognition information is received, the OS is notified of the message from the message source, preventing installation of any unwanted network device driver.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2005-252473, filed on Aug. 31, 2005, which is hereby incorporated by reference herein in its entirety.

What is claimed is:

1. An information processing apparatus which can have network communication means and in which an OS for detecting a network device via the network communication means and automatically installing a corresponding device driver is installed, comprising:
   input means for inputting identification information for temporarily recognizing a network device whose device driver is to be installed;
   determination means for, when a network entry message issued from a network device on a network is received via the network communication means, determining whether identification information which matches the identification information input by said input means is described in the network entry message; and
   control means for, when said determination means determines that the identification information which matches the identification information input by said input means is not described in the network entry message, controlling to block notification of the network entry message to the OS, and when said determination means determines that the identification information which matches the identification information input by said input means is described in the network entry message, controlling to notify the OS of the network entry message,
   wherein the identification information described in the network entry message is input in advance via an operation panel of the network device, and
   wherein the input identification information is provided to a module, in the network device, controlling to issue the network entry message.

2. The apparatus according to claim 1, further comprising erase means for erasing the identification information input by said input means when a network entry message containing a description which matches input identification information is not received within a predetermined time after input of the identification information by said input means, and when a network entry message containing matched identification information is received.

3. A method of controlling an information processing apparatus which can have network communication means and in which an OS for detecting a network device via the network communication means and automatically installing a corresponding device driver is installed, comprising:
   an input step of inputting identification information for temporarily recognizing a network device whose device driver is to be installed;
   a determination step of, when a network entry message issued from a network device on a network is received via the network communication means, determining whether identification information which matches the identification information input in the input step is described in the network entry message; and
   a control step of, when the identification information which matches the identification information input in the input step is determined in the determination step not to be described in the network entry message, controlling to block notification of the network entry message to the OS, and when the identification information which matches the identification information input in the input step is determined in the determination step to be described in the network entry message, controlling to notify the OS of the network entry message,
   wherein the identification information described in the network entry message is input in advance via an operation panel of the network device, and
   wherein the input identification information is provided to a module, in the network device, controlling to issue the network entry message.

4. A non-transitory computer-readable medium, which is loaded and executed by a computer to function as an information processing apparatus which can have network communication means and in which an OS for detecting a network device via the network communication means and automatically installing a corresponding device driver is installed, functioning at least as:

input means for inputting identification information for temporarily recognizing a network device whose device driver is to be installed;

determination means for, when a network entry message issued from a network device on a network is received via the network communication means, determining whether identification information which matches the identification information input by said input means is described in the network entry message; and control means for, when said determination means determines that the identification information which matches the identification information input by said input means is not described in the network entry message, controlling to block notification of the network entry message to the OS, and when said determination means determines that the identification information which matches the identification information input by said input means is described in the network entry message, controlling to notify the OS of the network entry message, wherein the identification information described in the network entry message is input in advance via an operation panel of the network device, and wherein the input identification information is provided to a module, in the network device, controlling to issue the network entry message.

5. An information processing system formed from at least one network device which is connected to a network, and an information processing apparatus which can have network communication means and in which an OS for detecting the network device via the network communication means and automatically installing a corresponding device driver is installed, wherein the information processing apparatus comprises:

first input means for inputting identification information for temporarily recognizing a network device whose device driver is to be installed;

determination means for, when a network entry message issued from a network device on the network is received via the network communication means, determining whether identification information which matches the identification information input by said first input means is described in the network entry message; and control means for, when said determination means determines that the identification information which matches the identification information input by said first input means is not described in the network entry message, controlling to block notification of the network entry message to the OS, and when said determination means determines that the identification information which matches the identification information input by said first input means is described in the network entry message, controlling to notify the OS of the network entry message, and wherein the network device comprises:

second input means for inputting identification information for causing the information processing apparatus in which the device driver is to be installed, to temporarily recognize the network device;

first transmission means for transmitting, onto the network, a network entry message which describes the identification information input by said second input means; and second transmission means for, when information on the network device is requested from the network, transmitting the requested information as a message to a requesting apparatus.

6. An information processing apparatus which can have network communication means and in which an OS for detecting a network device via the network communication means and automatically installing a corresponding device driver is installed, comprising:

input means for inputting identification information for temporarily recognizing a network device whose device driver is to be installed;

determination means for determining whether identification information which matches the identification information input by said input means is described in a response message received after a network device search message which describes information representing a type of network device whose device driver is to be installed is transmitted via the network communication means; and control means for, when said determination means determines that the identification information which matches the identification information input by said input means is not described in the response message, controlling to block notification of the response message to the OS, and when said determination means determines that the identification information which matches the identification information input by said input means is described in the response message, controlling to notify the OS of the response message, wherein the identification information described in the response message is input in advance via an operation panel of the network device, and wherein the input identification information is provided to a module, in the network device, controlling to issue the response message.

7. The apparatus according to claim 6, further comprising erase means for erasing the identification information input by said input means when the response message containing a description which matches input identification information is not received within a predetermined time after input of the identification information by said input means, and when a response message containing matched identification information is received.

8. A method of controlling an information processing apparatus which can have network communication means and in which an OS for detecting a network device via the network communication means and automatically installing a corresponding device driver is installed, comprising:

an input step of inputting identification information for temporarily recognizing a network device whose device driver is to be installed;

a determination step of determining whether identification information which matches the identification information input in the input step is described in a response message received after a network device search message which describes information representing a type of network device whose device driver is to be installed is transmitted via the network communication means; and a control step of, when the identification information which matches the identification information input in the input step is determined in the determination step not to be described in the response message, controlling to block notification of the response message to the OS, and when the identification information which matches the identification information input in the input step is determined in the determination step to be described in the response message, controlling to notify the OS of the response message, wherein the identification information described in the response message is input in advance via an operation panel of the network device, and wherein the input identification information is provided to a module, in the network device, controlling to issue the response message.

9. A non-transitory computer-readable medium which is loaded and executed by a computer to function as an information processing apparatus which can have network communication means and in which an OS for detecting a network device via the network communication means and automatically installing a corresponding device driver is installed, functioning at least as:

input means for inputting identification information for temporarily recognizing a network device whose device driver is to be installed;

determination means for determining whether identification information which matches the identification information input by said input means is described in a response message received after a network device search message which describes information representing a type of network device whose device driver is to be installed is transmitted via the network communication means; and control means for, when said determination means determines that the identification information which matches the identification information input by said input means is not described in the response message, controlling to block notification of the response message to the OS, and when said determination means determines that the identification information which matches the identification information input by said input means is described in the response message, controlling to notify the OS of the response message, wherein the identification information described in the response message is input in advance via an operation panel of the network device, and wherein the input identification information is provided to a module, in the network device, controlling to issue the response message.

10. A network device which can connect to a network and executes a predetermined service process in response to a request from the network, comprising:

input means for inputting identification information for causing an information processing apparatus in which a device driver is to be installed, to temporarily recognize the network device;

first transmission means for transmitting, to a source, a response message which describes the identification information input by said input means when a search message for a network device which performs the same service as the service process executed by the network device is received from the network; and second transmission means for, when a request message addressed to the network device for information on the network device is received from the network, transmitting, to a requesting apparatus of the request message, a response message which describes the information requested by the request message, wherein the requesting apparatus requests from the network device the information on the network device, when the identification information described in the response message transmitted by said first transmission means has been inputted in advance to the requesting apparatus by a user.

11. A method of controlling a network device which can connect to a network and executes a predetermined service process in response to a request from the network, comprising:

an input step of inputting identification information for causing an information processing apparatus in which a device driver is to be installed, to temporarily recognize the network device;

a first transmission step of transmitting, to a source, a response message which describes the identification information input in the input step when a search message for a network device which performs the same service as the service process executed by the network device is received from the network; and a second transmission step of, when a request message addressed to the network device for information on the network device is received from the network, transmitting, to a requesting apparatus of the request message, a response message which describes the information requested by the request message, wherein the requesting apparatus requests from the network device the information on the network device, when the identification information described in the response message transmitted by said first transmission means has been inputted in advance to the requesting apparatus by a user.

12. An information processing system formed from at least one network device which is connected to a network, and an information processing apparatus which can have network communication means and in which an OS for detecting the network device via the network communication means and automatically installing a corresponding device driver is installed, wherein the information processing apparatus comprises:

first input means for inputting identification information for temporarily recognizing a network device whose device driver is to be installed;

determination means for determining whether identification information which matches the identification information input by said first input means is described in a response message received after a network device search message which describes information representing a type of network device whose device driver is to be installed is transmitted via the network communication means; and control means for, when said determination means determines that the identification information which matches the identification information input by said first input means is not described in the response message, controlling to block notification of the response message to the OS, and when said determination means determines that the identification information which matches the identification information input by said input means is described in the response message, controlling to notify the OS of the response message, and wherein the network device comprises:

second input means for inputting identification information for causing the information processing apparatus in which the device driver is to be installed, to temporarily recognize the network device;

first transmission means for transmitting, to a source, a response message which describes the identification information input by said second input means when a search message for a network device which performs the same service as the service process executed by the network device is received from the network; and second transmission means for, when a request message addressed to the network device for information on the network device is received from the network, transmitting, to a requesting apparatus of the request message, a response message which describes the information requested by the request message.

* * * * *